US011208949B2

(12) United States Patent
Malkamäki et al.

(10) Patent No.: US 11,208,949 B2
(45) Date of Patent: Dec. 28, 2021

(54) SYSTEM, METHOD AND COMPUTER PROGRAM FOR OPERATING A LAND- OR MARINE-BASED MULTI-SPOOL GAS TURBINE

(71) Applicant: Aurelia Turbines Oy, Lappeenranta (FI)

(72) Inventors: Matti Malkamäki, Berlin (DE); Ahti Jaatinen-Värri, Lappeenranta (FI); Jari Backman, Lappeenranta (FI); Juha Honkatukia, Lappeenranta (FI)

(73) Assignee: AURELIA TURBINES OY, Lappeenranta (FI)

( * ) Notice: Subject to any disclaimer, the term of this patent is extended or adjusted under 35 U.S.C. 154(b) by 197 days.

(21) Appl. No.: 15/753,807

(22) PCT Filed: Aug. 19, 2016

(86) PCT No.: PCT/FI2016/050571
§ 371 (c)(1),
(2) Date: Feb. 20, 2018

(87) PCT Pub. No.: WO2017/029437
PCT Pub. Date: Feb. 23, 2017

(65) Prior Publication Data
US 2018/0252158 A1    Sep. 6, 2018

(30) Foreign Application Priority Data

Aug. 20, 2015  (GB) .................................... 1514790

(51) Int. Cl.
*F02C 7/10*       (2006.01)
*F02C 1/06*       (2006.01)
(Continued)

(52) U.S. Cl.
CPC ................ *F02C 1/06* (2013.01); *F02C 3/045* (2013.01); *F02C 6/006* (2013.01); *F02C 7/10* (2013.01); *F02C 9/42* (2013.01); *H02K 7/1815* (2013.01)

(58) Field of Classification Search
CPC .... F02C 7/08; F02C 9/28; F02C 3/107; F02C 7/10; H02P 9/04; H02P 9/008; H02P 9/007; H02P 9/006
See application file for complete search history.

(56) References Cited

U.S. PATENT DOCUMENTS 5,778,675 A    7/1998  Nakhamkin
2002/0148227 A1*  10/2002  Mackay ................... F02C 1/06
                                                         60/772
(Continued)

FOREIGN PATENT DOCUMENTS

CN    100353033 C    12/2007
EP    2730768 A1    5/2014
(Continued)

OTHER PUBLICATIONS

GB search report dated Oct. 9, 2015 in GB application No. 1514790.3.
ISR dated Nov. 9, 2016 in PCT application No. PCT/FI2016/050571.

*Primary Examiner* — Gerald L Sung
(74) *Attorney, Agent, or Firm* — Thomas | Horstemeyer, LLP

(57) ABSTRACT

The present invention is a system, method and computer program for operating a land-or marine-based multi-spool gas turbine system for generating electrical power to supply
(Continued)

a load, wherein the system comprises a multi-spool gas turbine engine, and the method comprises controlling the rotational speeds of the at least two generators independently of each other so as to directly control the rotational speeds of the shafts of the spools, the at last two generators being operable to generate electrical current to supply the load, and regulating the amount of heat generated the first heat generating equipment. A computer program to perform the method is also disclosed.

20 Claims, 11 Drawing Sheets

(51) Int. Cl.
*F02C 9/42* (2006.01)
*F02C 3/045* (2006.01)
*F02C 6/00* (2006.01)
*H02K 7/18* (2006.01)

(56) References Cited

U.S. PATENT DOCUMENTS

| | | | |
|---|---|---|---|
| 2002/0152754 A1* | 10/2002 | MacKay | F02C 1/06 |
| | | | 60/772 |
| 2005/0001598 A1* | 1/2005 | Belokon | F02C 7/08 |
| | | | 323/234 |
| 2005/0056021 A1 | 3/2005 | Belokon et al. | |
| 2010/0021284 A1 | 1/2010 | Watson | |
| 2011/0094236 A1 | 4/2011 | Finkenrath et al. | |
| 2012/0000204 A1 | 1/2012 | Kesseli et al. | |
| 2012/0324903 A1 | 12/2012 | Dewis | |
| 2015/0176437 A1* | 6/2015 | Tobo | F01K 23/101 |
| | | | 60/778 |

FOREIGN PATENT DOCUMENTS

| | | |
|---|---|---|
| JP | S5471213 A | 6/1979 |
| JP | 2003307103 A | 10/2003 |
| JP | 2005076791 A | 3/2005 |
| JP | 2011140899 A | 7/2011 |
| JP | 2014214660 A | 11/2014 |
| WO | 20090117442 A2 | 9/2009 |

* cited by examiner

SYSTEM, METHOD AND COMPUTER PROGRAM FOR OPERATING A LAND- OR MARINE-BASED MULTI-SPOOL GAS TURBINE

PRIORITY

This application is a U.S. national application of the international application number PCT/FI2016/050571 filed on Aug. 19, 2016 and claiming priority of GB national application 1514790.3 filed on Aug. 20, 2015, the contents of both of which are incorporated herein by reference.

TECHNICAL FIELD OF THE INVENTION

The invention concerns in general the technical field of electrical and mechanical power generation by utilizing gas turbine plants. Especially the invention concerns the control of the operation of a land- or marine-based gas turbine plant with a multi-spool gas turbine for generating electrical power to supply a load.

BACKGROUND OF THE INVENTION

The electrical energy production is at the moment going through major changes. The pollution and greenhouse gas emissions of the energy sector have gained increasing attention. At the same time as the electrical energy production is moving towards renewable energy based energy production, the electrical grid is also facing new challenges. Previously, the power plants connected to the electrical grid were very large such as nuclear power plants, large coal-based power plants, etc. This centralized electrical power generation, of course, causes losses in the electrical grid because the energy must be transferred over long distances.

Distributed power generation is closer to the consumption and thus smaller losses occur in the electrical grid due to shorter distances over which the energy is being transferred compared to the case of centralized power generation. Distributed power generation can also increase the local security of power supply. In contrast to the centralized power generation plants which typically operate at their rated power serving so called base load, the distributed power generation plants have to be able to constantly adjust their operation and output power based on load demand, utilized more typically as load following power plants.

The adjustability of the output power of the plants is especially important if the electrical grid seizes to feed or receive power such as in case of islanding conditions during which the power generation and power consumption must be equal typically in a rather small area wherein the electrical grid is weak. In these cases, the operation is entirely relying on the control and operation of a single power generation unit or few power generation units. It is, therefore, of utmost importance to have power plants which can run at high efficiency also at part-load conditions and can rapidly adjust their output power. Adjustability and high efficiency at part-load conditions are also very important when a power plant is operating as a reserve for intermittent power sources such as solar or wind power plants.

One major reason why the amount of installed distributed energy production has not increased more is the higher price of the energy produced by these systems compared to, e.g., price of the electricity produced with larger units. This is typically due to a lower electrical efficiency compared to large power plants. Gas engine or gas turbine plants, which are more and more being used in the electrical energy production, are good examples of power plants that can be utilized in distributed power generation.

Gas turbine plants are also designed to operate at 100 percent of the nominal load, i.e. the design point. Nowadays, the electrical production efficiencies of commercial gas turbines at their design points are at the most around 40 percent. The electrical efficiency which itself is not very high, quickly decreases if the gas turbine is being operated at part-load conditions, i.e., at load conditions less than 100 percent of the nominal load.

A typical gas turbine power plant comprises a compressor, a combustor, a turbine and an electrical generator. The compressor and the turbine are mounted on the same shaft and form a single spool. The generator is also mounted on the shaft.

Some prior art describes solutions with gas turbines having two spools. A two-spool system offers potentially better efficiency than a single-spool system and more power can be produced with the same turbine inlet temperature and with the same heat input to the process compared to a single-spool system. The magnitude of the pressure increase that a compressor must be able to produce typically affects the efficiency of the compressor and the system in a way that the higher the total pressure increase, the lower the compressor efficiency is.

It is also relatively common in the prior art to utilize a recuperator for preheating the air fed into the combustor and an intercooler to remove some of the heat of the compressed air coming from the low pressure compressor if more than one compressor is being utilized. Both of these devices increase the efficiency of the gas turbine plant.

Some prior art also describes gas turbines with multi-spool system, i.e., for example three spools. Most of these are in aviation related applications in which the weight and compactness are very important in the designing of these systems. In land- and marine-based applications, size and structure are less important but, for example, efficiency becomes more important. Also, especially in distributed power generation, it is essential to take controllability as well as part-load operation and efficiency carefully into consideration when designing the gas turbine plant.

In case of single-spool gas turbines, the most common load type is an electrical generator running at a constant rotational speed. The control is performed in such a way that the rotational speed is kept constant and the power output is varied with turbine inlet temperature. If the rotational speed varies, the power absorbed by the compressor varies. Depending whether there is a surplus or deficiency of net power the engine will either accelerate or decelerate.

The difference in the operation of two-spool systems compared to a single-spool system is that the flow compatibility must be satisfied between the spools. If the turbines are connected in series, the pressure ratio of the upstream turbine is fixed by the swallowing capacity of the downstream turbine or nozzle in case of jet engines. If the low pressure turbine or nozzle is choked, the preceding turbine will operate at a fixed non-dimensional operating point, and when they are unchoked, the preceding turbine will work at a fixed pressure ratio for each pressure ratio of the succeeding turbine or nozzle. In practice, typically, the low pressure turbine in a two-spool configuration will be choked over the most of the useful operating range.

In constant speed aero-derivative gas turbines, which typically comprise more than one spool, the low pressure shaft has to run at synchronous speed throughout the operating range while the other shaft speeds vary with power. At synchronous speed and no-load conditions, the low pressure compressor delivers substantially more flow than the high pressure compressor can intake. Therefore, significant amounts of air need to be blown off after the low pressure compressor during the loading of the unit which is unbeneficial from the efficiency perspective.

At part-load conditions, the two-spool gas turbines typically need to be controlled on the intake of their low pressure compressor, the mass flow of which is essentially determined based on the rotational speed of the compressor. This is due to the fact that at part-load conditions, there is less "back pressure" towards the compressors due to the lower amount of fuel combusted and smaller mass flow, therefore, operating the system closer to the surge conditions, which may cause one or both of the compressors to fail. This phenomenon is relatively well known and described in the literature.

At some part-load conditions and in most of the transient situations, the two compressors coupled together may fall into such situation, where one or both of the compressors are possible to surge or stall.

There are also a few typical solutions utilized to solve the above-mentioned problems that can be found in the literature. For multi-spool gas turbines, typically two-spool gas turbines including high and low pressure spools however, like aeroplane jet engines, the following methods are being used for the control: Inlet Guide Vanes (IGV), Air bleed, Control of the propelling nozzle or the turbine nozzles.

The IGV's are being used in the first stages of the compressors so that the air flow, typically, to the low pressure compressor, can be reduced at part-load operation. The air bleeding is another method, where air is being bled after a compressor in order to increase the airflow through it and thus avoid the possible surge.

Control of the propelling nozzle is a method, where after the turbine (in aeroplane) the exhaust gas flow can be affected by the nozzle in order to let the low pressure shaft accelerate quicker to the nominal speed by reducing the back pressure of it. There are also power generation applications based on this design, i.e., gas turbines that have a variable geometry nozzle in order to control the exhaust gas flow to the work-turbine after the gas turbine.

Control of the turbine nozzles (radial) and stator vanes (axial) is another method used quite often in reciprocating engine turbochargers. The turbine nozzles/stator vanes of the turbine are being turned in order to match the flow better to the speed of the turbine impeller itself and thus higher component efficiencies can be reached.

All these above-mentioned measures to control a turbine at part-load conditions are well described in numerous scientific articles and text books. They include components with variable geometry mechanisms and have, therefore, bearings and other movable parts that are prone to wear and require careful maintenance. It is desirable in land- and marine-based gas turbines that they run at high efficiency with high availability while able to quickly adjust their output power based on the desired output power. Therefore, it would be desirable to omit variable geometry mechanisms which are costly to manufacture, prone to wear and tear, and have high losses while posing threats to reliability.

SUMMARY OF THE INVENTION

An objective of the invention is to present a system, method and computer program for operating a land- or marine-based multi-spool gas turbine.

The objectives of the invention are reached by a system, method and computer program as defined by the respective independent claims. Embodiments of the invention are presented in dependent claims.

According to a first aspect, the present invention is a land- or marine-based multi-spool gas turbine system for generating electrical power to supply a load comprising at least two spools, each one of the at least two spools comprising a shaft and a turbine mounted on the shaft, the turbine arranged to receive gas at an elevated temperature to be expanded in order to produce mechanical power, a compressor mounted on the shaft of the spool, the turbine of which is being arranged to have the highest pressure of the turbines, i.e. the highest pressure turbine, the compressor arranged to receive gas and to compress the received gas, a first heat generating equipment operable to generate heat and to transfer heat into compressed gas so that the compressed gas turns into gas at an elevated temperature that is expanded in the highest pressure turbine to produce mechanical power to drive the compressor and a generator, the at least two spools being in fluid communication with each other, wherein each one of the downstream turbines is being arranged to receive the gas at an elevated temperature from the turbine arranged to operate at higher pressure than the turbine receiving the gas, at least two generators, each of which being mechanically coupled to a predefined one of the shafts to be rotatably driven thereby, each one of the shafts thus having one mechanically coupled generator, the at least two generators being operable to generate electrical current to supply a load, and the at least two generators being independently controllable of each other; and a control equipment arranged to control the operation of the gas turbine system and configured to control rotational speeds of the at least two generators and to regulate amount of heat generated in the first heat generating equipment.

In an embodiment, the system comprises a first heat exchanger arranged to receive the compressed gas from the compressor, and gas at an elevated temperature from the last downstream turbine arranged to have the lowest pressure of the turbines, i.e. the lowest pressure turbine, causing heat transfer from the gas at an elevated temperature to the compressed gas so as to pre-heat the compressed gas before being fed into said first heat generating equipment.

In an embodiment, the control equipment may comprise means for determining turbine inlet temperature of the highest pressure turbine, temperature of the expanded gas at an elevated temperature fed into the first heat exchanger and rotational speeds of the at least two generators, and means for controlling the rotational speeds of the at least two generators and means for regulating the amount of heat generated in the first heat generating equipment.

In one embodiment, each of the at least two spools may comprise one compressor mounted on the predefined shaft and is driven by the turbine mounted on said predefined shaft; i.e. the at least two spools comprising at least two compressors. Each of the at least two compressors are being coupled to different shafts.

In another embodiment, the first heat generating equipment may be a combustor operable to combust fuel in mixture of gas, such as e.g. air, to produce gas at an elevated temperature to be fed into the highest pressure turbine.

In an embodiment, the first heat generating equipment may be an external heat generating equipment having a heat generation unit operable of generating heat and an associated heat exchanger operable of transferring the heat generated in the heat generation unit to the compressed gas.

In an embodiment, at least one second heat exchanger may be arranged to receive gas to be transferred into a compressor and cooling medium from an external source so as to decrease the temperature of the gas. Each one of the at least one second heat exchanger may be arranged to transfer the gas into one compressor.

In an embodiment, a power electronics unit may be coupled with the at least two generators, the power electronics unit operable to process the alternating currents from the at least two generators and convert said alternating currents to alternating currents suitable for supply to a load.

In an embodiment, the power electronics unit may comprise at least two rectifiers, each one of the at least two rectifiers arranged to convert the alternating current from a predetermined one of the at least two generators so as to produce direct current at a non-alternating voltage, and an inverter arranged to convert the non-alternating direct currents from the at least two rectifiers to alternating current suitable for supply to a load.

In an embodiment, at least one second heat generating equipment may be arranged to receive gas at an elevated temperature from an upstream turbine to reheat the gas at an elevated temperature, each one of the at least one second heat generating equipment transferring the reheated gas to one downstream turbine.

According to an embodiment, the control equipment may be arranged to determine the temperature of said reheated gas at an elevated temperature fed into one downstream turbine.

In an embodiment, the system may comprise an auxiliary system comprising an energy source for operating the gas turbine during predefined abnormal conditions.

In an embodiment, the system may comprise at least one active magnetic bearing coupled to at least one or each of the shafts of the spools.

According to an embodiment, the at least two generators may have nominally substantially equal power ratings, and the rotating parts of the at least two generators having nominally substantially equal rotational speed ratings.

In some embodiments, said at least two spools may comprise at least three spools, each one of the at least three spools including a shaft and a turbine mounted on the shaft, the turbine arranged to receive gas at an elevated temperature to be expanded in order to produce mechanical power.

According to an embodiment, the control equipment may be spatially distributed among multiple locations.

In another embodiment, the control equipment may comprise at least a first control element and at least two second control elements, wherein the first element is located in connection with a controlling unit and comprises the means for determining the turbine inlet temperature of the highest pressure turbine, temperature of the expanded gas at an elevated temperature fed into the first heat exchanger and the means for regulating the amount of heat generated in the first heat generating equipment, and the at least two second control elements are located in connection with the at least two rectifiers, respectively, and comprises the means for controlling the rotational speeds of the at least two generators.

According to a second aspect, the present invention is a method for operating a land- or marine-based multi-spool gas turbine system for generating electrical power to supply a load wherein the system comprises at least two spools including rotatable shafts and turbines mounted on the shafts, wherein gas at an elevated temperature is being expanded in the turbines to produce mechanical power, a compressor mounted on the shaft of the spool, the turbine of which is being arranged to have the highest pressure of the turbines, i.e. the highest pressure turbine, and the compressor being arranged to be driven by the highest pressure turbine, the compressor arranged to receive gas and to compress the received gas, a first heat generating equipment generating heat and transferring the heat to the gas compressed by the compressor to turn the compressed gas into the gas at an elevated temperature, said gas at an elevated temperature is being expanded in the highest pressure turbine to drive the compressor mounted on the same shaft, the compressor, the first heat generating equipment and the turbines of the at least two spools being in fluid communication with each other, the method comprising controlling the rotational speeds of the at least two generators independently of each other so as to directly control the rotational speeds of the shafts of the spools, the at least two generators being operable to generate electrical current to supply the load, and regulating the amount of heat generated in the first heat generating equipment.

In some embodiments, the system comprises each of the at least two spools comprising one compressor mounted on the predefined shaft and is driven by the turbine mounted on said predefined shaft, i.e. the at least two spools comprising at least two compressors, wherein the method comprises utilizing the at least two compressors to compress gas.

In an embodiment, the method may comprise utilizing at least one second heat exchanger arranged to receive gas to be transferred into one of the at least two compressors and cooling medium from an external source so as to decrease the temperature of the received gas, each one of the at least one second heat exchanger arranged to transfer the gas into one of the at least two compressors.

In some embodiments, the method may comprise controlling the rotational speeds of the at least two generators and regulating the inlet temperature of the highest pressure turbine so as to maintain the inlet temperature of the highest pressure turbine substantially at the predefined maximum allowable value in the first control mode.

According to an embodiment, the method may comprise controlling the rotational speeds of the at least two generators at predefined substantially constant values and regulating the amount of heat generated in the first heat generating equipment in the second control mode.

In an embodiment, the method may comprise utilizing a first heat exchanger to pre-heat the compressed gas before being fed into the first heat generating equipment, the first heat exchanger arranged to transfer heat from the expanded gas at an elevated temperature from the turbine arranged to have the lowest pressure of the turbines, i.e. the lowest pressure turbine, into the compressed gas received from the compressor mounted on the shaft of the spool, the turbine of which is being the highest pressure turbine.

In some embodiments, the method may comprise controlling the rotational speeds of the at least two generators and the amount of heat generated such as to maintain the temperature of the gas at an elevated temperature injected into the first heat exchanger substantially at the predefined maximum allowable value in the third control mode.

In an embodiment, the method may comprise operating the gas turbine system relative to the output power of said system in at least two or more of the first, second or third control modes.

According to an embodiment, the method may comprise providing at least one second heat generating equipment arranged to receive gas at an elevated temperature from an upstream turbine to reheat the gas at an elevated temperature, utilizing the at least one second heat generating equipment for generating heat and transferring the heat into the gas at an elevated temperature prior being fed into the corresponding downstream turbine, and regulating the amount of heat generated in the at least one second heat generating equipment so as to maintain the inlet temperature of the corresponding downstream turbine substantially at the predefined maximum allowable value.

In an embodiment, the method may comprise controlling the rotational speeds of the at least two generators by utilizing a power electronics unit.

In some embodiments, the method may comprise utilizing the at least two generators as motors when starting up the system by utilizing predefined start-up ramps.

In an embodiment, the method may comprise controlling the rotational speeds of the at least two generators such that the shutting down of the system is done by utilizing predefined shutdown ramps.

In an embodiment, the method may comprise supplying electrical power into a brake resistor or resistors or into an energy storage in case of a power outage in the electrical grid.

According to an embodiment, the method may comprise controlling the operating points of the compressors on their performance maps, and thereby avoid a surge. The controlling may be done according to the present invention and the operating points of the compressors may be set by means of controlling the rotational speeds of the at least two generators so that surge conditions can be avoided.

According to an embodiment, the method may comprise providing active magnetic bearings operatively connected to the shafts of the spools, and preferably determining the rotational speeds of the generators by utilizing information from the active magnetic bearings.

According to an embodiment, the method may comprise controlling the rotational speeds of the at least two generators so that the rotation of the shafts of the at least two spools are decelerated/accelerated through predetermined or dynamically determined undesirable speeds of the spools in order to minimize the time of operation at said undesirable speeds.

According to an embodiment, the method may comprise determining said undesirable speeds by utilizing measurement data from the active magnetic bearings or an accelerometer or a position sensor or an eddy-current sensor in connection with the spool.

According to a third aspect, the present invention is a computer program operable, when executed on a computer, to perform the method according to the second aspect of the invention.

An advantage of the system and method according to the present invention is that the rotational speed of the spools is not controlled indirectly such as, e.g. in case of controlling the gas flow and thus, trying to affect the actual speed of the turbine, but rather by direct control by utilizing the electrical converters of the electrical generators and the controller equipment which determines the rotational speeds of the spools and can change the electrical torque of the generators accordingly to maintain the desired speed and/or load.

The control method according to the present invention does not need any additional vanes in the system and thus, does not produce excess power that would be lost. The method and system according to the present invention enables, especially during the part-load conditions, generating more power by causing more air to flow to the compressors and thus avoids surge conditions.

The method and system also eliminates or at least minimizes the need for components with variable geometry mechanisms prone to wear and tear. All of the above will lead to significantly higher efficiency compared to prior art solutions, especially at part-load conditions, in addition to faster control and lesser and easier maintenance.

The exemplary embodiments of the invention presented herein are not to be interpreted to pose limitations to the applicability of the appended claims. The verb "to comprise" is used in this patent application as an open limitation that does not exclude the existence of also un-recited features. The features recited in depending claims are mutually freely combinable unless otherwise explicitly stated.

The novel features which are considered as characteristic of the invention are set forth in particular in the appended claims. The invention itself, however, both as to its construction and its method of operation, together with additional objectives and advantages thereof, will be best understood from the following detailed description when read in connection with the accompanying drawings.

BRIEF DESCRIPTION OF FIGURES

The embodiments of the invention are illustrated in the way of examples, and not by way of limitation, in the figures of the accompanying drawings.

DETAILED DESCRIPTION OF THE INVENTION

Figure 1:
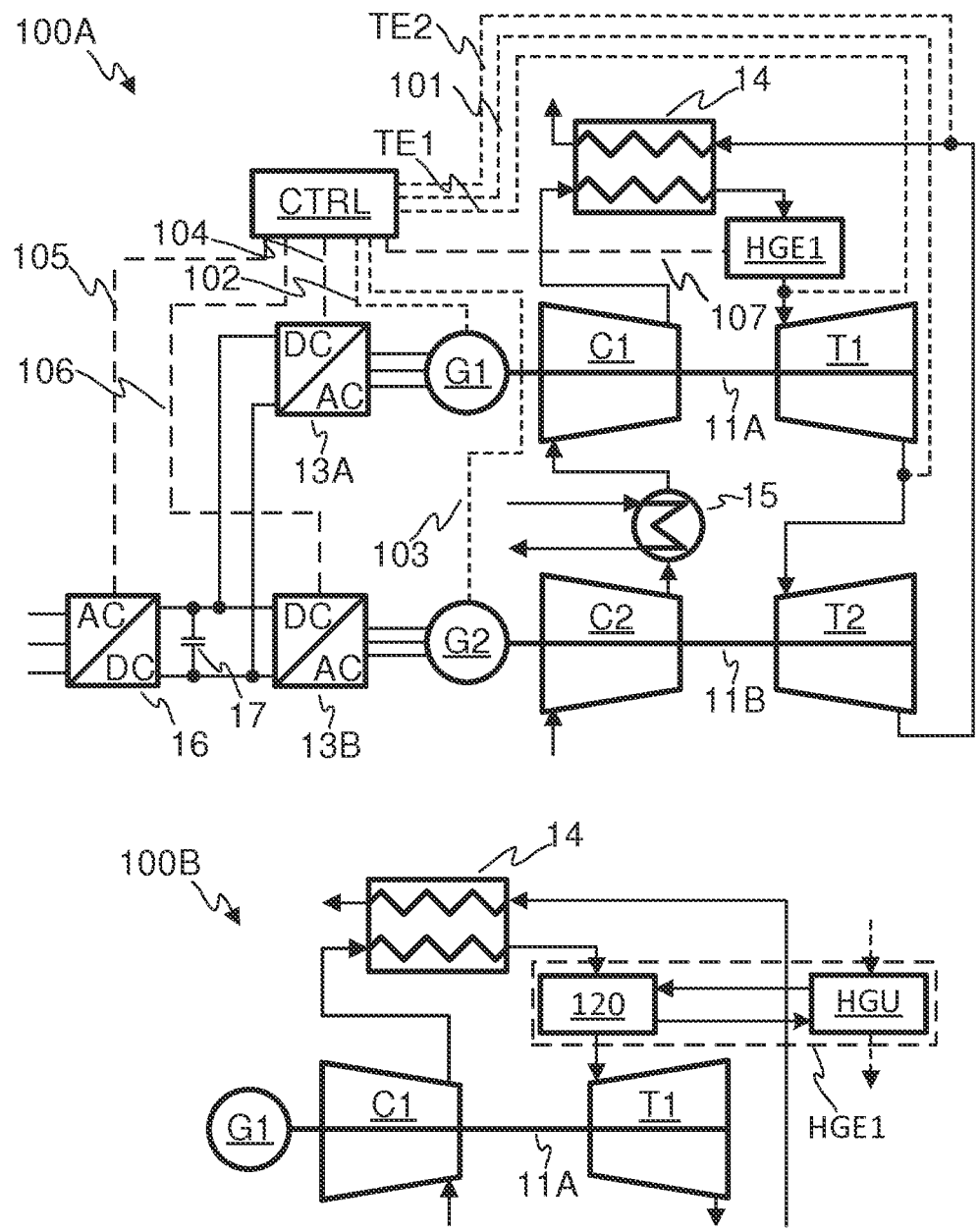
FIG. 1 illustrates schematically a system according to an embodiment of the present invention.

The present disclosure relates to a system for producing electrical power to supply a load by utilizing a land- or marine-based gas turbine and a method and a computer program for controlling thereof. Land-based gas turbines refer here to any stationary or moving application utilizing gas turbines on land. These may be, e.g., stationary power plants, trains, heavy duty-vehicles also known as heavy vehicles. Heavy vehicles may include, e.g., machinery utilized in earthwork operations.

The system includes at least two spools each of which comprising at least a shaft and a turbine mounted on the shaft and at least one of the at least two spools further comprising a compressor. The system further comprises a first heat generating equipment and at least two generators, each one mounted on the predefined one of the shafts. The system may also comprise a first heat exchanger and/or at least one second heat exchanger and/or at least one second heat generating equipment.

The compressors used in the embodiments according to the present invention may, preferable, be of the centrifugal type but may also be of the axial type or any other type capable of increasing the pressure of the fluid flowing through the compressor. The materials used in the compressors and, especially, in their blades may be, e.g. but not limited to, aluminum, titanium alloys or martensitic steel alloys. There may also be specific coatings to improve erosion resistance of the blades and to enable higher temperature to be utilized.

The turbines used in the embodiments according to the present invention may, preferable, be of the radial type but may also be of the axial type or any other type capable of letting the fluid flowing through and expanding in the turbines and thus to produce mechanical power. The materials used in the turbines and, especially, in their blades may be, e.g. but not limited to, iron- or nickel-based alloys being produced by utilizing either conventional ingot metallurgy or powder metallurgy. Also ceramic materials may be used in the turbines. There may also be specific coatings to improve erosion resistance of the blades and to enable higher temperature to be utilized.

The heat exchangers used in the embodiments according to the present invention may, preferable, be of the countercurrent flow type but may also be any other kind of a heat exchanger operable to transfer the heat from a heat source with higher temperature to the gas coming into the heat exchanger. The heat source with higher temperature may be, e.g., gas leaving from some of the turbines. Heat exchangers may also be used to cool the gas in the gas turbine by using a cooling medium with lower temperature to remove some of the heat in the gas flowing in the gas turbine. The cooling medium used may be, e.g., liquid such as water or any other fluid. Materials used in the production of heat exchangers may be any material withstanding the elevated temperatures and pressures and having typically high thermal conductivities. These may be, e.g. but not limited to, stainless-steel-based or nickel-chromium-based alloys.

The heat generating equipment used in the embodiments according to the present invention may be any kind of combustor operable to combust fuel in the mixture of gas, such as e.g. air, to produce gas at an elevated temperature. It may be a simple can type combustor or a combustor with a more complicated structure. It may be cannular, annular or double annular combustor. The combustors, preferably, comprise a fuel injection and an ignition system operable to combust fuel in the mixture of gas, such as e.g. air. Preferably, the amount of fuel injected by the fuel injection system can be controlled by the control system of the gas turbine. The fuel injection system may, e.g., be a pressurized fuel injection system having a spraying system with spray nozzles through which the fuel is being pumped with pressure. If the fuel used in the combustor requires utilization of the atomizing air or other supporting mechanisms in order to achieve controllable and efficient combustion, also these may be included in the combustor. The fuel injection system may include one or several valves in series or in parallel for controlling the flow of the fuel.

The heat generating equipment may also be a combustor of variable geometry type. The combustor of variable geometry type may include an actuator with which the geometry of the combustor may be altered. The combustor may be constructed by using variety of materials being able to withstand the elevated temperatures and pressures occurring in the gas turbine process. These materials may be, e.g. but not limited to, nickel- or cobalt-based alloys. Also ceramic materials may be used in the combustors. There can also be various thermal barrier coating materials serving as an insulating layer to reduce the underlying metal base temperatures.

The heat generating equipment may be an external heat generating equipment in which case the heat generated by it in a heat generation unit is transferred to the compressed gas from the first compressor, or from a recuperator i.e. the first heat exchanger, using an associated heat exchanger integrated into or installed in connection with the external heat generating unit. Accordingly, the temperature of compressed gas increases on its way towards the first turbine. For instance, in case of combustors when the fuel utilized is unsuitable for directly be used in gas turbines, external heat generating equipment such as an externally fired combustor may be preferred to prevent harmful particles entering the gas turbine process.

The heat generation units of the external heat generating equipment may further be fuel cells or solar thermal collectors generating heat which is then transferred from the first heat generating equipment to the compressed gas. The above mentioned alternative heat generation units with associated heat exchangers may also be used as a second heat generating equipment thus transferring heat to reheat the expanded gas from an upstream turbine.

The fuel injected or heat generated may be regulated based on the desired amount of power to be supplied to the electrical grid or to any load in electrical connection with the gas turbine. The fuel injection or heat generation may be regulated based on other parameters as well such as, e.g., voltage, current, temperature, pressure or mass flow.

The electrical generators utilized in the gas turbine system according to the embodiments of the present invention may be of synchronous or asynchronous type. The generators may be direct current (DC) generators, permanent magnet generators, induction generators, doubly-fed induction generators or any other kinds of generators operable to convert mechanical energy of the rotating axis into electrical energy. The number of phases of the generators may, preferably be three, but may also be two in case of DC generators, or, e.g., six. Also, the generators may have wye or delta connection and be either grounded or ungrounded.

The power electronics unit may include frequency converters connected to the electrical generators or may include rectifiers for the generators to convert the alternating current (AC) coming from the generator, in case of AC generators, into DC and then an inverter or inverters to convert the DC into AC with the desired frequency such as, e.g., the frequency in the electrical grid or of an AC load.

The operation of the inverter may be based on pulse-width modulation (PWM) techniques utilizing semiconductor switching devices. The switching devices perform switching action at a high frequency, typically, several hundreds or even thousands of times in a second. By switching at high frequency and by varying the portion of switching periods during which the switches are closed (or open depending on the system), the inverter produces a current waveform which is suitable to be injected to the electrical grid. Also other methods may be used to convert the direct current to alternating current.

There are different control strategies and objectives that may be used to perform the control of the electrical grid or load side inverter. Typically these include: the control of the DC-link voltage, active and reactive power delivered to the grid, and grid synchronization and to ensure sufficient quality of the supplied power. Typically the control system includes two cascaded loops. The inner loops control the grid currents and the outer loops control the DC-link voltage and the active and reactive power. The current loops are responsible of the power quality, thus harmonic compensation can be added to the action of the current controllers to improve it. The outer loops control the power flow of the system by controlling the active and reactive power delivered to the grid.

The control system in connection with the power electronics unit and/or heat generating equipment, preferably, includes electronics capable of receiving measurement data and generating control signals in order to control the torque and rotational speed of all of the electrical generators as well as the amount of heat generated in the heat generating equipment. The control system may be able to receive information from the sensors arranged to measure thermodynamic parameters of the system such as temperatures and pressures and/or electrical parameters such as currents and voltages of the generators, power electronic circuits, parameters in the auxiliary systems or voltages and currents in the electrical grid or load into which the electrical power of the gas turbine is being supplied. The control system may include feedback loops, feed-forward paths and may be based on some of the variety of control methods such as, e.g., scalar volts-per-Hertz control, vector control also known as field-oriented control or direct torque control.

The control system may be capable of controlling the rotational speeds and the electrical torques of the electrical generators independently of each other as is known from the prior art. The rotational speed may be kept constant while the torque produced varies. It is also possible to keep the torque constant while varying the rotational speeds. This enables controlling the output power of the generators independently of the rotational speeds.

The control system may include, e.g., a central processing unit (CPU), a memory element such as, for example, non-volatile memory such as read-only memory (ROM), or volatile memory such as Random-Access Memory (RAM), and a communication unit. The control software, such as control algorithms, instructions, predetermined parameters and conditions, and the method according to the present invention in general may be stored in the memory in a suitable format to be performed by the CPU. The communication unit, which may be utilized to send and/or receive data to/from an external system, may comprise an antenna and/or a communication port for wired communication technology, e.g. Ethernet or other local area network (LAN) interface. In case of wireless communication, the communication unit may utilize e.g. radio frequency technologies such as wireless local area network (WLAN), Global System for Mobile Communication (GSM), Third Generation (3G), Long Term Evolution (LTE) technologies, Fourth Generation (4G), Fifth Generation Mobile Networks (5G), etc.

The control system may be performed on, e.g., one computer or may also be spatially distributed into several different locations. The control of the gas turbine process may be stored on, e.g., a controlling unit whereas the control system of the generators is in connection with the inverters. These units may then be in communication with each other by wireless or wired means of communication.

The gas turbine system with two spools according to an embodiment of the present invention is shown schematically in FIG. 1, at 100A. The elements of the gas turbine in FIG. 1 and their primary purposes may, in general terms, be described as follows. The second compressor C2 and the first compressor C1 increase the pressure of the gas flowing through them. The second heat exchanger 15 removes some of the heat from the gas to a cooling medium. In the second heat exchanger 15, the cooling medium removing some of the heat from the gas is being fed from an external source (not shown in FIG. 1).

The first heat exchanger 14 is utilized to pre-heat the gas by utilizing expanded gas at an elevated temperature coming from the second turbine T2. In the first heat generating equipment HGE1, in case of a typical combustor, the compressed gas is being mixed with fuel and heat is being released in the combustion process, thus generating gas at an elevated temperature. In case of an external heat generating equipment, e.g. an externally-fired combustor or a fuel cell, the heat generated is transferred to the compressed gas by utilizing the associated heat exchanger. Furthermore, in the first turbine T1 and in the second turbine T2, the gas at an elevated temperature expands and produces mechanical power to rotate the electrical generators, i.e., the first generator G1 and the second generator G2, and the first compressor C1 and the second compressor C2. The first spool includes the first shaft 11A, the first compressor C1 and the first turbine T1. The second spool includes the second shaft 11B, the second compressor C2 and the second turbine T2. The first and second generators G1, G2 are coupled to the first and second shafts 11A, 11B, respectively. It should be noted, however, that the present invention is not limited to gas turbines with two spools but to turbines with at least two spools, i.e., for example three or four or more spools.

Furthermore in FIG. 1, the generators G1 and G2 are in electrical connection with the rectifiers 13A and 13B, respectively. The rectifiers convert the alternating current coming from the generators into direct current. The direct current is then fed to the inverter 16, typically via intermediate circuit including an energy storage unit 17 such as a capacitor or an inductor, magnetic field of which may be utilized as a temporary energy storage. The intermediate circuit may also include a battery or supercapacitor(s) or other energy sources in order to support the operation of the gas turbine plant in conditions where the electrical grid is not available. The inverter then converts the direct current into alternating current suitable to be injected to the electrical grid or an electrical load, typically, with a frequency of 50 or 60 hertz, depending on the electrical grid. The control equipment CTRL may be used for controlling the operation of the rectifiers and the inverter by control signals 104 and 106, and 105, respectively.

In FIG. 1, at 100B, an embodiment of the present invention is shown in which the first heat generating equipment is an external heat generating equipment having a heat generating unit HGU and an associated heat exchanger 120. In FIG. 1 at 100B only a part of the system at 100A is shown for clarity reasons. The rest of the system in this particular embodiment is similar to the one depicted in the figure at 100A. The external heat generating equipment may be, e.g., an externally fired combustor, a fuel cell system (preferably high temperature fuel cells such as, e.g., solid oxide fuel cells, molten carbonate fuel cells, direct carbon fuel cells, etc.) or a solar thermal system (such as concentrated solar power system utilizing solar power tower, parabolic troughs, dishes, lenses, Fresnel reflectors, etc.) having an associated heat exchanger 120 transferring the generated heat to the compressed gas coming from the first heat exchanger 14. The vertical dashed arrows at HGU indicate fluid flows in case they exist. Hereinafter the first and second heat generating equipment may or may not be an external heat generating equipment.

While the heat generated in combustors and fuel cells may be regulated by regulating the amount of fuel injected, the regulation of the heat generation in solar thermal systems requires different measures. Typical techniques are such as to turn the solar thermal collectors and/or mirrors or lenses with respect to the direct path of the solar radiation thus increasing or reducing the amount of radiation absorbed, e.g. by single- or dual-axis control.

Some of the measurement and control signals according to an embodiment of the present invention are presented in FIG. 1, at 100A. Thermodynamic parameters such as turbine inlet temperature TE1 of the first turbine T1, turbine outlet temperature TE2 of the second turbine T2, which is also the temperature of gas at an elevated temperature of the first heat exchanger 14, may be measured and fed into the control equipment CTRL. The control equipment may be capable of transmitting control signals 105 to the inverter 16, 104, 106 to the rectifiers 13A, 13B and 107 to the first heat generating equipment HGE1. It is also typical to determine the rotational speeds 102, 103 of the electrical generators G1, G2 by using various known methods and sensors. Rest of the measurement and control signals are omitted from the figure due to clarity reasons.

Figure 2:
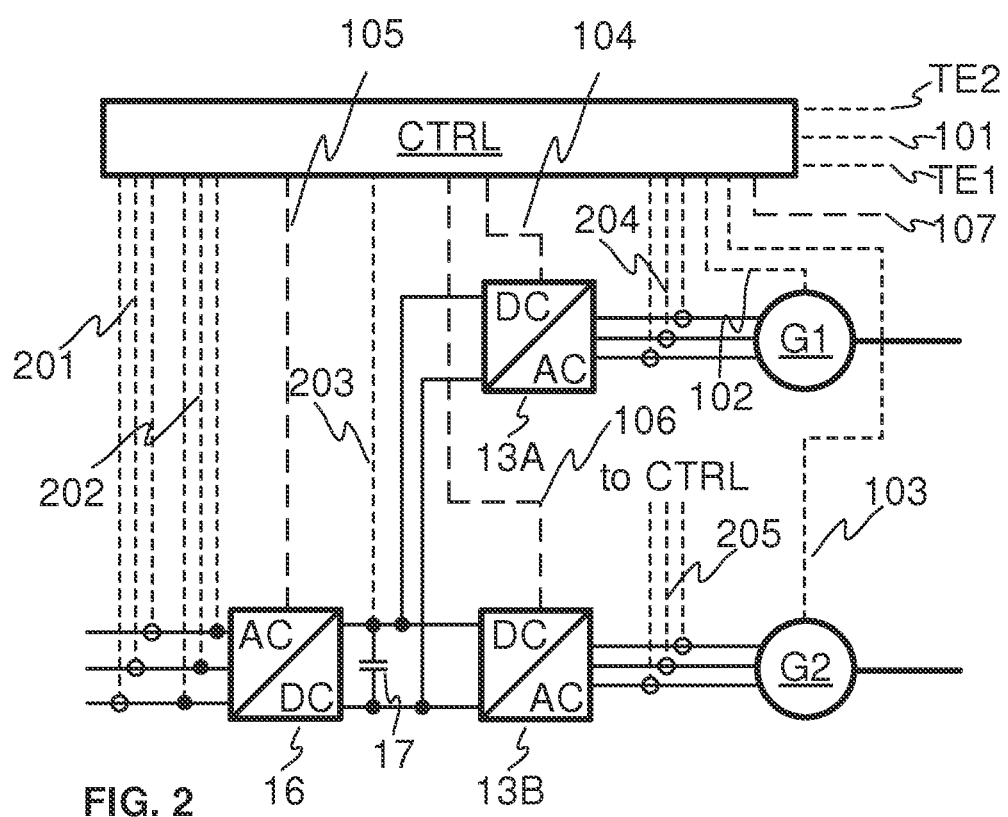
FIG. 2 further illustrates a system of measurement and control signals according to an embodiment of the present invention.

There may also be some measurement signals that were omitted from FIG. 1 and are shown in FIG. 2. A skilled person will appreciate that there can also be additional or alternative measurement and control signals not shown in either FIG. 1 or 2. As can be seen in FIG. 2, the currents 201 and voltages 202 of the electrical grid may be measured in order to determine the power supplied to or absorbed from the electrical grid, and also to determine the phase angle and frequency for the synchronization of the operation of the gas turbine plant with the grid. It is often not necessary to measure all the phase currents and phase voltages, but it is enough to measure, e.g., from two phases in case of a three-phase system. The grid synchronization may be done by utilizing any phase-locked loop (PLL) method such as, e.g., second order general integrator phase-locked loop (SOGIPLL). Furthermore, the voltage of the intermediate circuit 203 may be measured in order to, e.g. ensure sufficient voltage level so that the current injected to the grid does not get distorted. There may also be output current measurements of the electrical generators 204, 205 in order to control the currents of the generators thus enabling the control of rotational speeds and torques of the generators. There may also be various other measurements in the system such as for measuring gas flows, powers, fuel flow rates, pressures and temperatures, etc.

Figure 3:
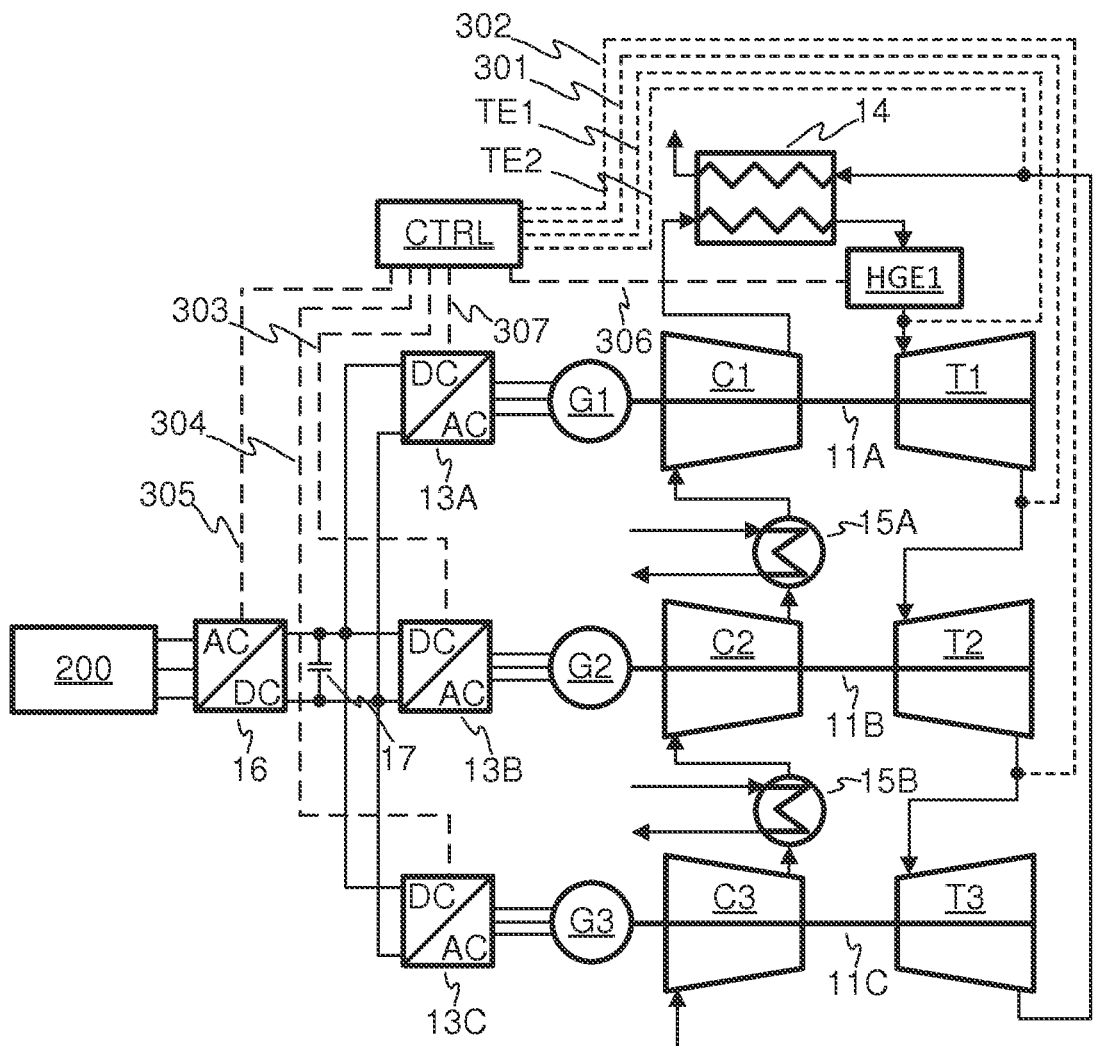
FIG. 3 illustrates schematically a preferable embodiment of the present invention with three spools.

FIG. 3 presents a preferable embodiment according to the present invention with three spools. Each spool includes a shaft 11A, 11B, 11C, and a compressor C1, C2, C3 and a turbine T1, T2, T3 mounted on the shaft. The first, second and third generators G1, G2, and G3 are coupled to the first, second and third shafts 11A, 11B, 11C, respectively. The first heat exchanger 14 is being utilized to pre-heat the compressed gas before going into the first heat generating equipment HGE1. In this embodiment, there are two second heat exchangers 15, one connected in between the first compressor C1 and the second compressor C2 and the other connected in between the second compressor C2 and the third compressor C3. Both of the second heat exchangers 15 are in fluid communication with the compressors down- and upstream from the second heat exchangers. Some of the measurements TE1, TE2, 301, 302 and control signals 303-307 that may be used are also shown in FIG. 3. Others that may be utilized are the same as in FIG. 2 in an embodiment with two spools, i.e. electrical measurements such as currents and voltages on the grid or load side 201, 202, voltage of the intermediate circuit 203 and currents of the electrical generators 204, 205. Electrical power produced by the electrical generators may be supplied to a load 200.

Figure 4:
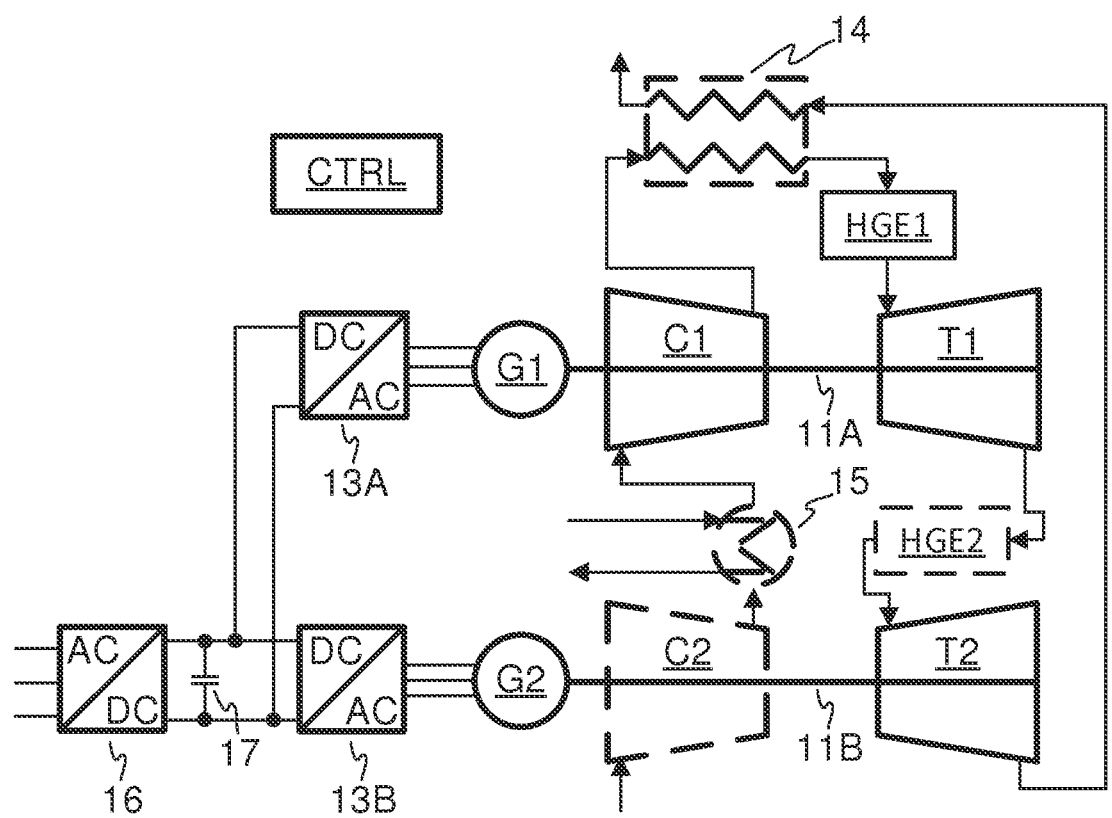
FIG. 4 illustrates schematically an embodiment of the present invention with optional elements marked with dashed lines.

FIG. 4 presents various embodiments of the present invention. The elements which are shown with dashed lines may be considered optional elements that may be omitted. In one simple embodiment, the second compressor C2 has been omitted as well as second heat exchangers 15 and second heat generating equipment HGE2. In this embodiment, gas coming into the system is being compressed only by the first compressor C1. Then the compressed gas is being fed into the first heat exchanger 14 in which the compressed gas is being pre-heated by utilizing gas at an elevated temperature coming from the lowest pressure turbine (T2 in the two-spool system illustrated in FIG. 4). Then the pre-heated, compressed gas is being fed into the first heat generating equipment HGE1 in which the compressed gas is being mixed with fuel in order to produce heat by combustion of the mixture of gas, such as e.g. air, and fuel in case of a typical combustor.

In case of an external heat generating equipment, the heat is transferred to the compressed gas by the associated heat exchanger 120 of the first heat generating equipment HGE1 (shown in FIG. 1 at 100B) such as in case of an externally-fired combustor, fuel cells or solar thermal system. After the first heat generating equipment HGE1, gas at an elevated temperature is being fed into the first turbine T1 in which the gas at an elevated temperature is being expanded and mechanical power is being produced and thus the first compressor C1 and the first generator G1 are being rotated to produce net electrical power. Then, the gas at an elevated temperature is further fed into the second turbine T2 in which the gas is further being expanded to produce mechanical power and to rotate the second generator G2 to produce net electrical power. After the second turbine T2 the gas is emitted from the gas turbine or fed into the first heat exchanger 14, if any. It should be noted in this case too that the present invention is not limited to gas turbines with two spools but the turbine system with at least two spools with the same optional elements as shown in FIG. 4.

According to various embodiments of the present invention, the electrical generators G1, G2, G3 may be directly coupled to the shafts 11A-11C of the spools without utilizing, for example, a gearbox, thus rotating at the same speed as the shafts 11A-11C.

According to various embodiments of the present invention, most of the total output power supplied to the load 200 in the form of electrical and mechanical power is generated by the electrical generators G1, G2, G3 in the form of electrical energy. The total output power refers herein to the sum of the electrical power and the mechanical power supplied to the load 200, wherein the load 200 is external with respect to the arrangement, by the arrangement. The total output power as defined herein does not include thermal output power such as energy exhausted out of the arrangement through an exhaust pipe, or thermal losses of the arrangement. According to an embodiment, at least 60 percent or, advantageously, at least 80 percent of the total output power supplied to the load 200 in the form of electrical and mechanical power is outputted by the electrical generators G1, G2, G3 in the form of electrical energy.

The load 200 herein refers to a load 200 that is external to the arrangement such as an electrical grid or a stand-alone electrical load such as an electrical supply system of, for example, a hospital or an industrial plant or a residential load. In marine based gas turbine plants, load 200 may be an electrical supply system of a ship and/or an electrical motor which is a part of a marine propulsion system of a ship.

The electrical generators G1, G2, G3 may, therefore, be arranged to produce the primary output power of the arrangement supplied continuously or intermittently to the load 200, which is external to the arrangement, by the arrangement in the form of electrical energy, and not to act only as an auxiliary power source or only to control the operation of the arrangement. Continuously or intermittently supplied power to said load 200 external with respect to the arrangement refers herein to typical operating conditions such as in nominal operating conditions or at a part-load conditions excluding power produced momentarily or for short periods of time, e.g., for a short power boost. However, the electrical generators G1, G2, G3 may be used also in controlling the operation of the gas turbine arrangement in conjunction with the control of the amount of heat generated in the first combustor Comb1 as well as in second combustors Comb2, if any.

According to an embodiment, a part of the electrical output power of the electrical generators G1, G2, G3 may be used to operate the gas turbine arrangement, i.e., to self-consumption of the arrangement. The self-consumption may be, for example, the power needed for the control system or the active magnetic bearings. However, still most of the total output power supplied to the load 200, being external with respect to the arrangement, by the arrangement. According to various embodiments at least 60 percent or, preferably, at least 80 percent of the output power supplied to the load 200 is produced by the electrical generators G1, G2, G3 in the form of electrical energy. Less than 40 percent or, preferably, less than 20 percent, respectively, of the total output power supplied to the load 200 in the form of electrical and mechanical power, that is, e.g., rotational energy of a shaft 11A-11C, may come or be consumed by other sources, such as from an additional turbine or a rotatable device, such as a fan or a pump, in fluid communication with the arrangement.

According to various embodiments of the present invention, the nominal power and/or rotational speed ratings of the generators may differ 10 or 15 percent from each other at most relative to the nominal power and/or rotational speed ratings of the generator with the highest nominal power and/or rotational speed ratings and still fall under the concept of substantially equal rating disclosed herein. In certain cases, the gas turbine process may be designed in such a way that it is beneficial to have slightly higher difference in the power ratings of the generators in order to optimize the operation of the system and, therefore, the limit for the difference in the ratings may, depending on the case, thus also be 20 percent.

According to an embodiment, the nominal power rating of an electrical generator G1, G2, G3 may be 30-1500 kilowatts. According to an embodiment, the nominal rotational speed rating of an electrical generator G1, G2, G3 may be 10000-120000 revolutions per minute. According to various embodiments, the maximum value of the turbine inlet temperature of the highest pressure turbine T1 may be 600-1500 degrees centigrade, preferably 750-1250 degrees centigrade.

According to various embodiments, the rotational speeds of the rotating parts of the electrical generators G1, G2, G3, that is their rotors, may not differ more than 30 percent relative to the rotational speed of the generator coupled to the spool rotating the fastest.

According to an embodiment, the electrical powers outputted by the electrical generators G1, G2, G3 may, preferably, be such that the difference between the electrical powers of the generators G1, G2, G3 relative to the nominal power rating of one of the electrical generators may not exceed 60 percent. If the nominal power ratings differ within the range in accordance with the present invention, then the electrical powers outputted by the electrical generators G1, G2, G3 may not differ more than 60 percent relative to the nominal power rating of the electrical generator with the highest nominal power rating.

Figure 5:
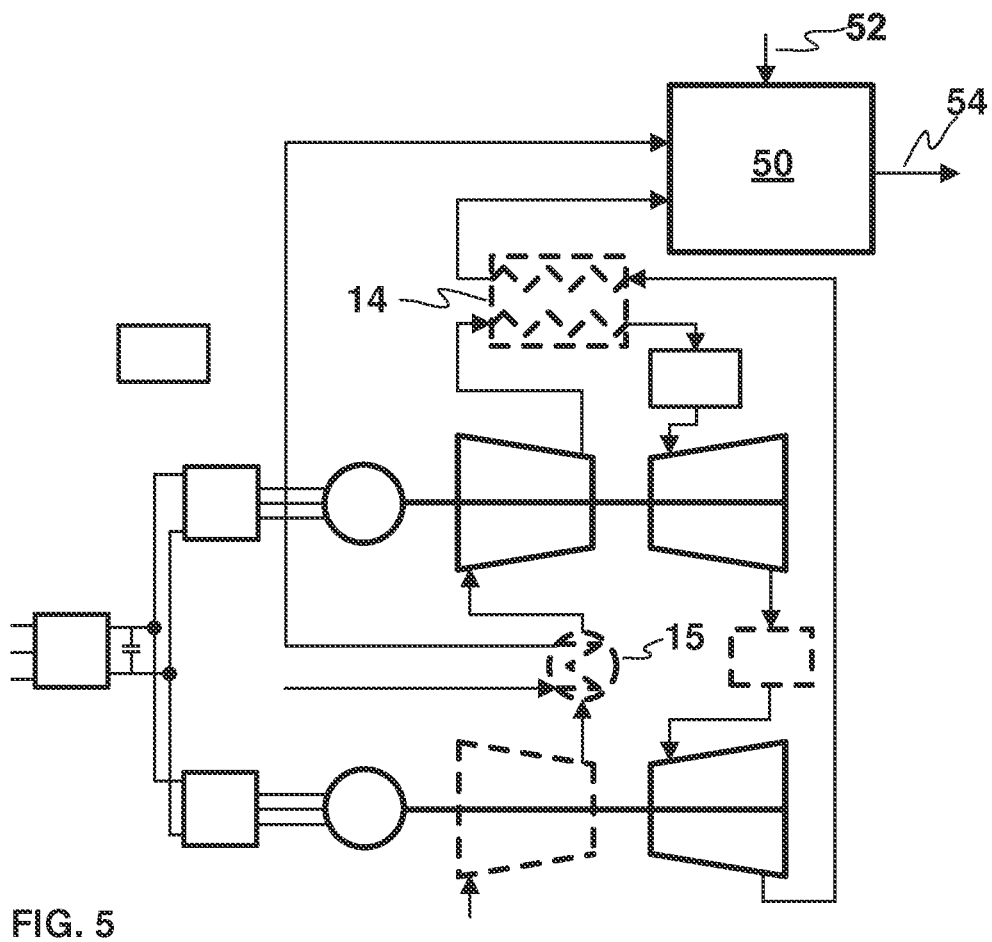
FIG. 5 illustrates schematically an external heat utilization process in fluid communication with the gas turbine system according to an embodiment of the present invention.

In FIG. 5, the gas turbine system is shown in fluid communication with an external process 50. The external process may be any heat utilization process in general such as, e.g., a steam boiler, a space heating system, a duct burner or any other burner utilizing pre-heated gases. The external process may utilize the cooling medium coming from the intercooler. In case of, e.g., a duct burner there is also fuel 52 coming from an external source. As a product of the process, there may be, e.g., steam 54. There may also be additional or alternative elements in the system not shown in the figure depending on the type of the external process, elements such as e.g. for utilizing the flow of exhaust gases or by-products.

The exemplary embodiments of the present invention presented above with reference to FIG. 4 are just few possible embodiments. As mentioned earlier, the present invention relates to gas turbines with at least two spools. Three spools in FIG. 3 is also only an example and should not be considered as a limitation. Any combination of the elements marked with dashed lines with the elements marked with solid lines may be regarded as an embodiment of the present invention regardless of the number of spools being two or more.

The basic principle of the control of the gas turbine system according to the present invention is to control the electrical power supplied to the electrical grid or to a load in order to match the desired electrical power output given by the operator or operating system, which may be any external system of the gas turbine plant, and to operate the system in stable operating points, e.g. to avoid compressor surge. The operation has two basic operation modes: a grid connection mode and an islanding mode. In the grid connection mode the gas turbine process is connected to the electrical grid and is supplying power into or absorbing (e.g. in case of start-up) power from the electrical grid. In the islanding mode, the connection to the electrical grid is lost or is not utilized at all such as in stand-alone systems, and the gas turbine plant supplies power only to the loads, if any, in connection with the gas turbine plant. In the islanding mode, there may be batteries utilized to feed or absorb power during rapid load changes. They may also be used during zero load conditions. In the islanding mode, there may or may not be a grid connection.

The control method according to the present invention is to control the rotational speeds of the generators to, primarily, control the gas flow in the gas turbine system. The rotational speeds may be varied while the amount of heat produced in the first heat generating equipment is kept constant or varied. The rotational speeds may also be kept constant while the amount of heat in the first heat generating equipment is being varied or kept constant. The controlling of the speeds and regulating the amount of heat may be based on predetermined values or based on feed-back loops, etc.

Figure 6:
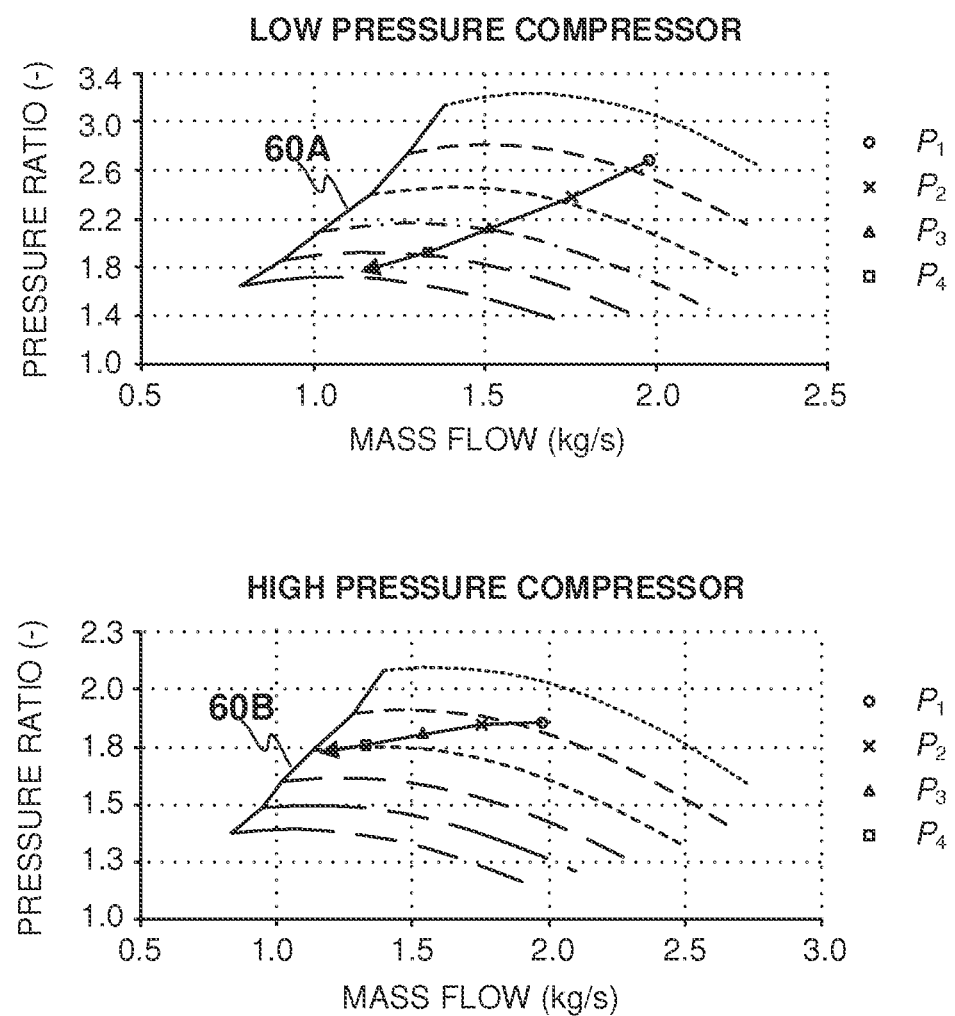
FIG. 6 illustrates by the way of an example performance maps of low and high pressure compressors according to a method in the prior art comprising a gas turbine with two spools.

The control method according to an embodiment of the present invention will be explained in the following. Let's consider, as an example, a two-spool system presented in FIG. 1. If the rotational speeds of the spools are not controlled, the operating points of the compressors settle in points determined by the different thermodynamic parameters such as the pressure ratio and inlet pressure of the compressor, temperatures and flow of the fluid in the process. This is shown in FIG. 6 utilizing the compressor performance maps. The different dashed curves represent constant rotational speed curves.

The curve connecting the leftmost points of the constant rotational speed curves is the surge line 60A, 60B. To maintain stable gas turbine operation the compressor operating points must be kept on the right-hand side of the surge line 60A, 60B. In the figures, $P_1$, $P_2$, $P_3$ and $P_4$ refer to four different operating points with powers such that: (power at $P_1$)>(power at $P_2$)>(power at $P_3$)>(power at $P_4$). As can be seen as the power decreases, the operating points of both of the compressors drift towards the surge line 60A, 60B. As a person skilled in the art will appreciate, the compressor efficiency has the highest values in the area roughly in the center of the compressor performance map, which means that the efficiency quickly decreases as the power decreases. If the turbine operates often at part-load conditions, the average efficiency will be much lower than in case of always operating close to the center of the performance map.

Figure 7:
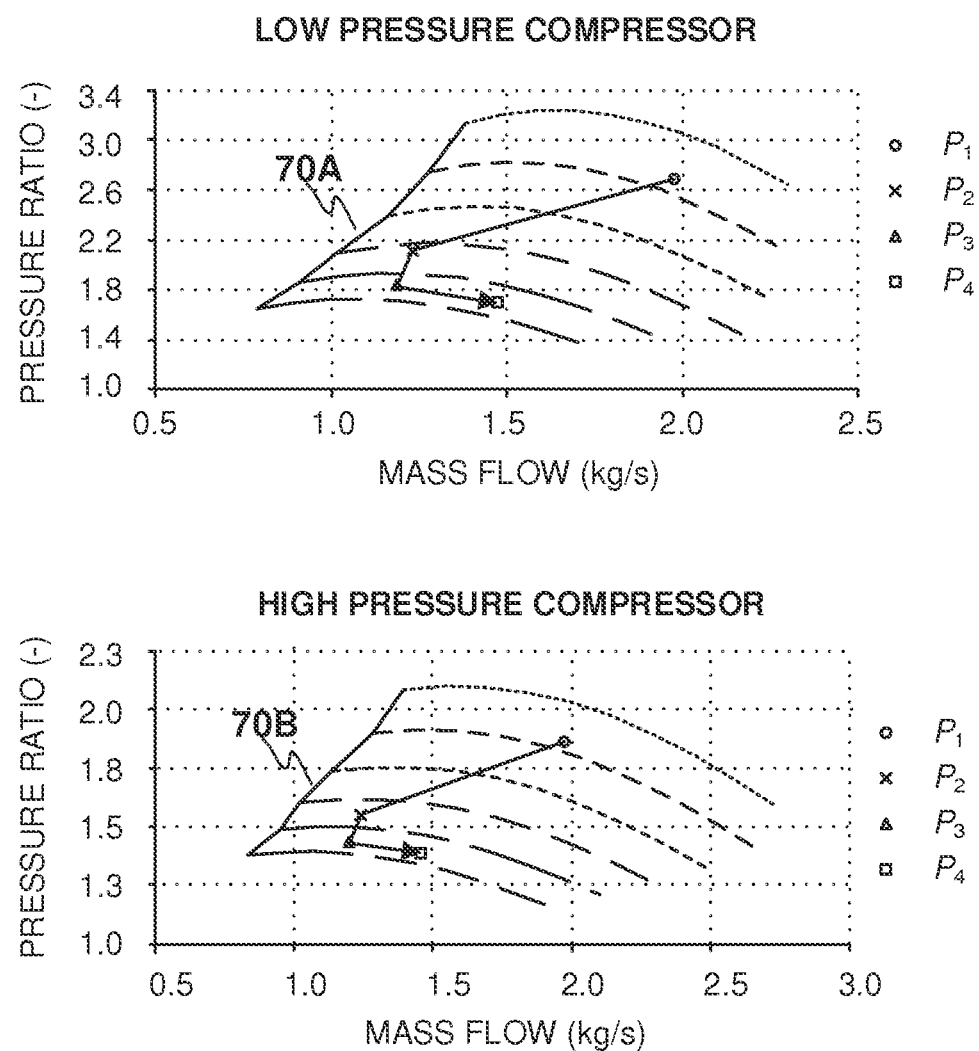
FIG. 7 illustrates by the way of an example performance maps of low and high pressure compressors according to an embodiment of the method of the present invention in the case of a gas turbine with two spools.

The idea of the control method according to the present invention is to control the rotational speeds of the spools directly by utilizing the generators in connection with the shafts of the spools. This is illustrated in FIG. 7, wherein the compressor performance maps are shown in case of utilizing the method according to an embodiment of the present invention. The curve connecting the leftmost points of the constant rotational speed curves is the surge line 70A, 70B. In this exemplifying case, the control is based on utilizing three different control modes: first, second and third control modes. The effect of different control modes can be seen in FIG. 7 for three different slopes on the curves. The different control modes will later be described in more detail. In this case too, there are four operating points (substantially the same operating points as in FIG. 6) shown in the performance maps for which (power at $P_1$)>(power at $P_2$)>(power at $P_3$)>(power at $P_4$). Again as the power decreases the operating points move towards the surge line 70A, 70B. In this case, however, the operating points remain closer to the area in the center of the performance maps. The utilization of the method according to the present invention thus enables higher efficiencies to be achieved especially at part-load conditions. Furthermore, the operating points of the compressors can be ensured to remain sufficiently far from the surge line 70A, 70B. This will also contribute in enabling long life-times for the systems.

The different exemplifying control modes according to embodiments of the present invention are now described. The first control mode is based on controlling the output power in such a way that the inlet temperature of the highest pressure turbine is kept at maximum allowable temperature. This is done by controlling the rotational speeds of the generators appropriately and regulating the amount of heat generated in the first heat generating equipment in order to produce the desired output power while maintaining the inlet temperature of the highest pressure turbine at maximum allowable temperature. In the second control mode, the rotational speeds of the generators are kept at predefined substantially constant values and the desired output power is produced by regulating the amount of heat generated. "Substantially constant" in this case refers to having the rotational speeds within ten percent of the predefined values in different operating conditions when utilizing the second control mode.

The values of the "substantially constant" rotational speeds of different generators may be substantially the same or different such as, e.g., having the both or all the generators rotating 25000 revolutions per minute (rpm) or having the generator of the low pressure spool rotating 27000 rpm and the generator of the high pressure spool rotating 31000 rpm or vice versa. The rotational speeds according to the present invention are not limited to any value but may be of any order depending on the application.

In the third control mode, the temperature of the expanded gas at an elevated temperature coming from the last turbine downstream, i.e. from the lowest pressure turbine (T3 In FIG. 3 and T2 in FIGS. 1 and 4), fed into the first heat exchanger 14 is controlled so as to keep the temperature at the maximum allowable value by appropriately controlling the rotational speeds of the generators and amount of heat generated in the heat generating equipment.

Figure 8:
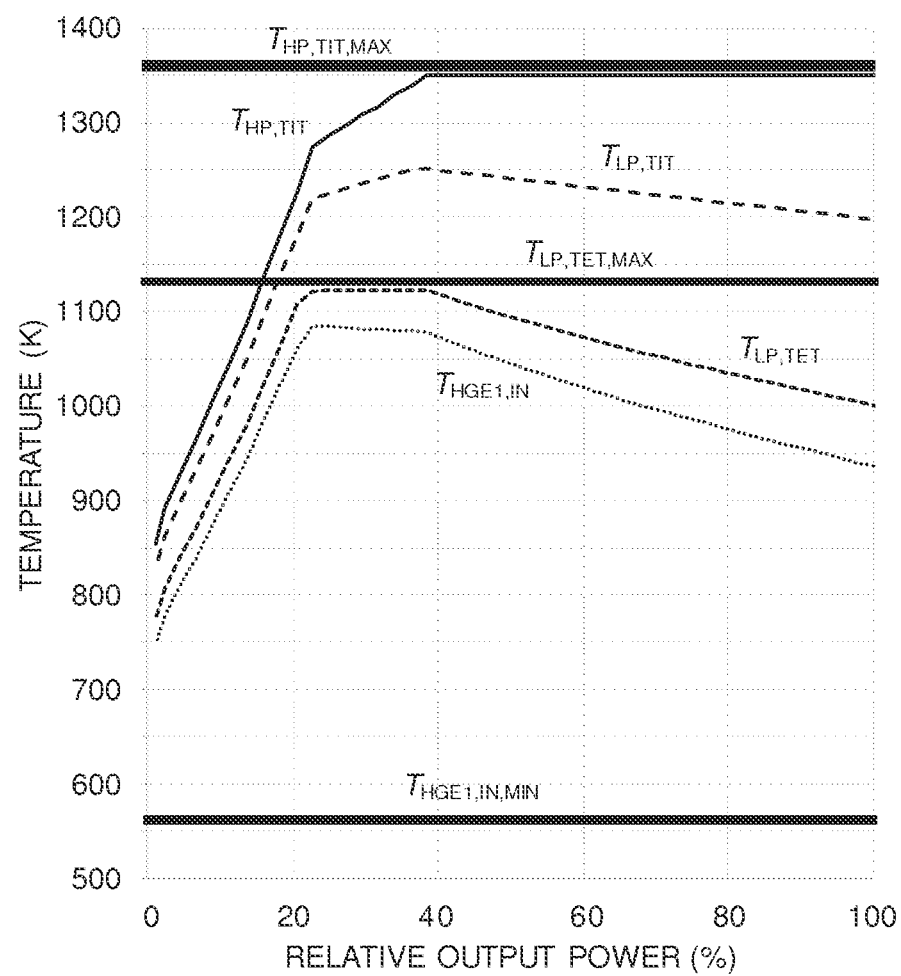
FIG. 8 illustrates by the way of an example various temperature values in the gas turbine as a function of power output according to an embodiment of the present invention utilizing three control modes.

FIG. 8 illustrates various temperatures by the way of an example according to an embodiment of the present invention in case of utilizing the three control modes described earlier. The temperatures in the figure are as follows: $T_{HP,TIT,MAX}$ is the maximum allowable value for the inlet temperature of the high pressure turbine, $T_{HP,TIT}$ is the inlet temperature of the high pressure turbine, $T_{LP,TIT}$ is the inlet temperature of the low pressure turbine, $T_{LP,TET,MAX}$ is the maximum allowable value for the outlet temperature of the low pressure turbine, $T_{LP,TET}$ is the outlet temperature of the low pressure turbine, $T_{HGE1,IN}$ is the inlet temperature of the first heat generating equipment. $T_{HGE1,IN,MIN}$ is the minimum allowable value for the inlet temperature of the first heat generating equipment. This minimum allowable value may become especially important in case of, e.g., combustors with catalytic combustion.

Starting from the right, i.e., from the relative output power of 100% and going into lower part-load conditions, in the first control mode $T_{HP,TIT}$ is kept at the maximum allowable value. In the figure, it has been sketched to be a bit lower due to clarity reasons. Next, in this case on the part of the curve around 22 to 38 percent, the outlet temperature of the low pressure turbine is kept at the maximum allowable value in the third control mode. Finally, in the part-load conditions approximately 0 to 22 percent, in the second control mode the temperature changes corresponding to conditions with substantially constant rotational speed of the spools and decreasing amount of heat generated in the first combustor.

Figure 9:
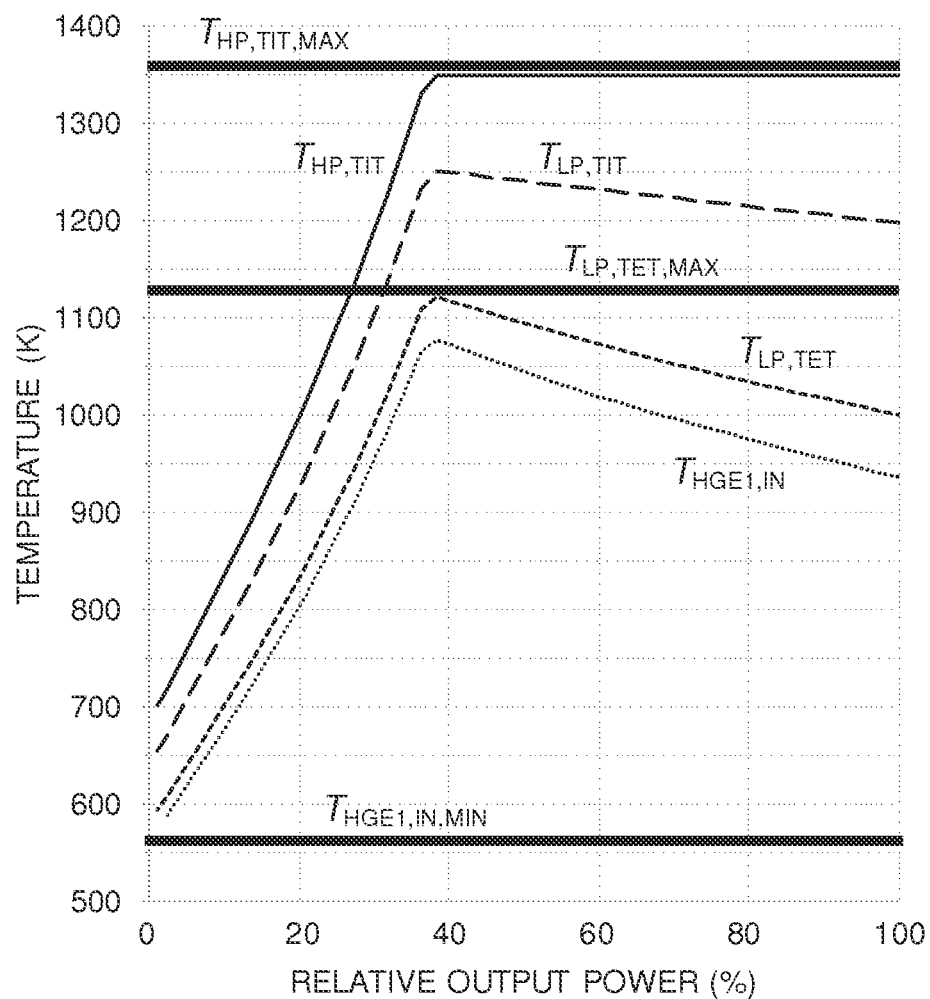
FIG. 9 illustrates by the way of an example various temperature values in the gas turbine as a function of power output according to an embodiment of the present invention utilizing two control modes.

In FIG. 9, the same temperatures are illustrated by the way of an example according to an embodiment of the present invention utilizing only the first and second control modes.

There may or may not be second heat exchangers utilized in the gas turbine according to the present invention. Whether or not they are being utilized, it does not affect the method according to the present invention. Aforementioned, about utilizing second heat exchangers, applies also to the embodiments with at least one second heat generating equipment HGE2. The heat generated by the at least one second heat generating equipment HGE2 is regulated such that the inlet temperature of the downstream turbine is always maximized in the first control mode. The operation is changed to the second or third or any other control mode once the inlet temperature of the first heat exchanger reaches the maximum allowable value in the first control mode. In this embodiment, in order to maximize the inlet temperatures of each of the downstream turbines, outlet temperatures of each of the at least one second heat generating equipment HGE2 are being determined, e.g. by measurement as also shown in FIGS. 1 and 3 (second heat generating equipment not shown in the figures). If this is done by a direct measurement, the measurement sensors in the embodiments including the second heat generating equipment must be placed downstream from said second heat generating equipment, in between said second heat generating equipment and the corresponding downstream turbine.

Control of the gas turbine system according to an embodiment of the present invention is described hereinbefore by the way of an example such that there is always only one control mode at a time being utilized. It should be noted, however, that the operation of the gas turbine according to the first, second or third control mode represents some specific conditions or a way of operation, and does not limit the operation of the gas turbine according to the present invention to these control modes.

According to an embodiment of the present invention, the control of the gas turbine system may be such that the amount of heat generated in the first heat generating equipment HGE1 and in other heat generating equipment, if any, electrical power generated by and/or the rotational speeds of the electrical generators G1, G2, G3 may be controlled or regulated in any way provided that different parameters of the system that do not violate the limits, such as exceed the maximum allowable value of the inlet temperature of the highest pressure turbine T1 or the maximum allowable value of the outlet temperature of the lowest pressure turbine $T_{LP,TET}$ or avoid certain rotational speeds or speed ranges such as related to the critical speeds of the spools, specified with respect to the first, second and third control modes. According to an embodiment of the present invention, the control of the gas turbine system may be such that none of said temperatures or rotational speeds of the electrical generators G1, G2, G3 is kept at a constant value.

According to an embodiment of the present invention, at least two or more of the control modes may be utilized relative to or depending on the output power of the gas turbine system as can be seen in FIGS. 8 and 9.

According to an embodiment of the present invention, the gas turbine system may be operated in or controlled relative to or depending on the output power of the gas turbine system at least according to the first control mode (from about 38% to about 100% in FIGS. 8 and 9) and in the second control mode (from 0 to about 22% in FIG. 8 and from 0 to about 38% in FIG. 9).

According to an embodiment of the present invention, the gas turbine system may be operated in or controlled relative to or depending on the output power of the gas turbine system at least according to the first control mode (from about 38% to about 100% in FIGS. 8 and 9) and to the third control mode (from about 22% to about 38% in FIG. 8).

According to an embodiment of the present invention, the gas turbine system may be operated in or controlled relative to or depending on the output power of the gas turbine system at least according to the second control mode (from 0 to about 22% in FIG. 8 and from 0 to about 38% in FIG. 9) and to the third control mode (from about 22% to about 38% in FIG. 8).

According to an embodiment of the present invention, the gas turbine system may be operated in or controlled relative to or depending on the output power of the gas turbine system at least according to the first control mode (from about 38% to about 100% in FIGS. 8 and 9) and to the second control mode (from 0 to about 22% in FIG. 8 and from 0 to about 38% in FIG. 9) and to the third control mode (from about 22% to about 38% in FIG. 8).

According to an embodiment of the present invention, the change of the control mode from one to another, in case of utilization of at least two control modes relative to or depending on the output power of the gas turbine system, may be based on a measured temperature value such as the value of the outlet temperature of the lowest pressure turbine $T_{LP,TET}$. Alternatively or in addition, the change of the control mode from one to another may be based on value of pressure ratio of a compressor or mass flow of a compressor. A limit of the parameter indicating a need for the change of the control mode from one to another may be determined such as to avoid a surge or a choke condition.

As can be seen in FIGS. 8 and 9, at operating points above approximately 38 percent (the peak of $T_{LP,TET}$) the gas turbine is operating in the first control mode. Below this point, the gas turbine is operating in the third or second control mode in FIG. 8 or 9, respectively. The limit of 38 percent may also be some other depending, e.g., on how high a temperature of the hot expanded gas the first heat exchanger can withstand.

Figure 10:
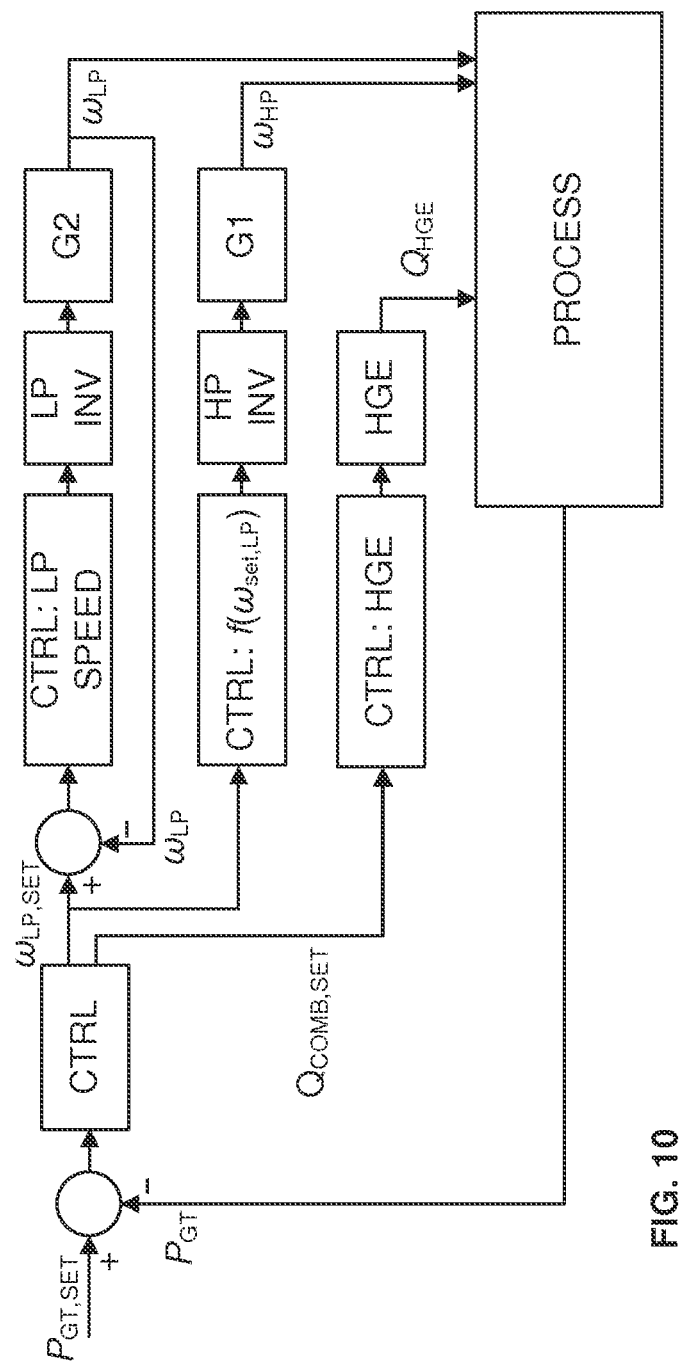
FIG. 10 illustrates schematically a control block diagram according to an embodiment of the present invention.

FIG. 10 illustrates schematically a control block diagram according to an embodiment of the present invention. As can be seen, the output power of the system is controlled based on the desired output power $P_{GT,SET}$. Based on $P_{GT,SET}$, the set value (or reference value) for the rotational speed of the low pressure spool and the set value for the first heat generating equipment is determined. The set value $\omega_{LP,SET}$ may be used, in general, as an input parameter of a suitable controlling function of the speed of the high pressure spool or directly as a set value for the speed of the high pressure spool. The control of the high pressure spool may also be based on feed-back control (not shown in FIG. 10).

A skilled person, however, will appreciate that the control block diagram in accordance with an embodiment may also be different from FIG. 10. It may include feedback loop for the high pressure spool as well as temperature feed-back control loops such as, e.g., for the inlet temperature of the highest pressure turbine. The system, of course, may have more control loops in case of more than two spools because the rotational speed of the each of the spool may be controlled separately. It may have control paths for said second heat generating equipment.

The control function ($f(\omega_{LP,SET})$ in FIG. 10) may be based on predetermined values stored in a memory or may be based on empirical equation or may take into account additional parameters such as by feedback or feed-forward.

Additional parameters may be currents, voltages, gas flows, pressures, temperatures or parameters derived from aforementioned parameters.

In an embodiment, the control may be based on controlling the speed of the high pressure turbine, set value of which is then utilized in the control of the low pressure turbine.

In an embodiment having three, four or more spools, the controlling may be done according to FIG. 10, but naturally there may be control loops for controlling the rotational speeds of each of the spools. The same principles may be used in this case as for two spools described hereinbefore.

In gas turbine systems, the spools often have rotational speeds above one or more critical speeds, i.e, predefined undesirable speeds. Prolonged operation at these speeds is very undesirable because of the wear and tear it causes to the gas turbine components. As mentioned, there can be one or several critical speeds and they can be at the same or different speeds for different spools.

If a control method according to an embodiment of the present invention is utilized, the rotational speeds of the spools can be controlled such as to minimize the time of operation at or close to the critical speeds. This can be done so that the rotational speed of a spool is increased or decreased rapidly through the critical speed. This is shown, by the way of an example, in FIG. 11 in which the operating line 110 is shown in a compressor performance map in a way having similar characteristics with the operating lines shown in FIG. 7. Critical speeds of the spools do not relate to compressors per se but are characteristic to the whole spool. The performance map is used herein only due to its convenience in describing the method according to an embodiment of the present invention. There may be undesirable critical speeds, the time of operation at which should be minimized, even in case where there is no compressor coupled to the spool.

Figure 11:
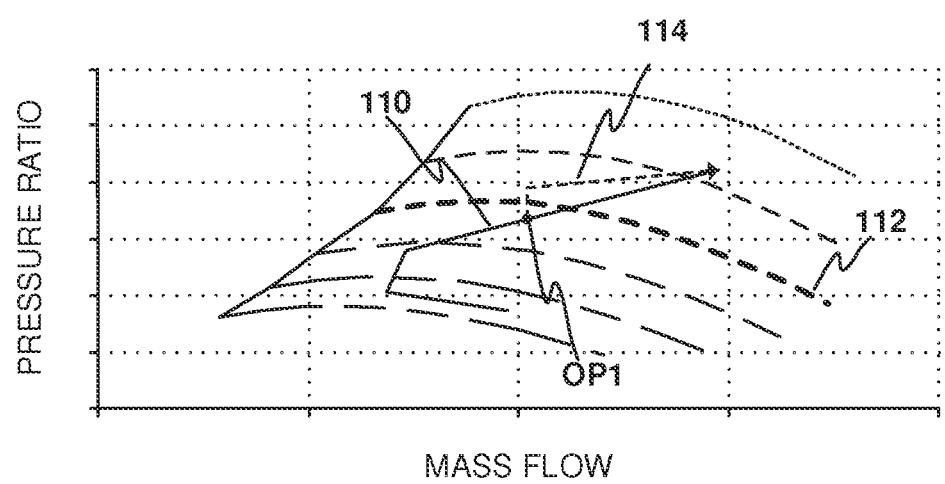
FIG. 11 illustrates by the way of an example the operation of the method for avoiding undesirable speeds according to an embodiment of the present invention.

In FIG. 11, if the rotational speed of the spool, and in this case the compressor, is to be increased from the initial operating point OP1 but it would lead to operation at or close to a critical speed 112, the speed of the compressor may be quickly increased by controlling the rotational speed of the spool by the generator. By utilizing the method according to an embodiment of the present invention, the speed is increased rapidly and in controlled manner through the critical speed 112. This is shown with the additional part of the operating line 114 depicted with a dashed line which at first is substantially vertical. The aforementioned is, naturally, only one example case and a person skilled in the art will appreciate that the method according to the present invention may be utilized in different conditions concerning operation at or close to a critical speed.

It may also be that there are critical speeds affecting each of the spools. These may be at the same or at different rotational speeds. This means that the operating line of each of the spools resembles the shape of the operating line 114 in FIG. 11. There may also be more than one critical speed per spool. In this case, the operating line will have more than one additional parts of the operating line 114. In case of two spools, the situation may be, as an example, such that the critical speed affects the high pressure spool if the speed of the spools is increased. In this case the speed is increased through the critical speed thus increasing the power produced by the high pressure spool. Then the speed and the power produced by the low pressure spool may be decreased by the corresponding amount in order produce the desired output power. The speed of the low pressure spool in this case may, however, be also kept substantially constant.

The critical speeds may be predetermined for each spool and then utilized in the control method to avoid operating at or close to these speeds. Or, alternatively, active magnetic bearings may be used to measure the amount of vibrations in the spool. If the amount of vibrations increases over a predetermined threshold, the rotational speed of the spool is increased or decreased by a sufficient amount in order to minimize the operation time at or close to the critical speed. A skilled person will appreciate that there may also be other solutions to monitor the amount of vibrations of the spools in order to determine operation at or close to a critical speed such as utilizing accelerometer(s), eddy-current sensor(s) or position sensor(s).

The gas turbine may have several different operating modes. In addition to basic operation, i.e. power varying from idle to design point, there may also be other operating modes such as start-up, normal shutdown, hot shutdown, grid-off shutdown, etc. In start-up, the spools are first accelerated by utilizing the generators as motors in order to reach the rotational speeds suitable for ignition of fuel, in case of heat generating equipment being combustor(s) for fuel, after which the burner of the combustor is started. In the next step, the normal power control is being activated and the gas turbine plant is ready to produce the desired electrical output power based on, e.g., hereinbefore described control modes according to the present invention.

In normal shutdown, the electrical power output is gradually decreased to zero in such a way that the temperatures in the process are not changing too rapidly. The burner is stopped and the spools decelerate to zero or, optionally, to barring speeds by utilizing suitable ramps avoiding surge and choke of the compressors, making sure that the scavenging of the gas turbine process is sufficient, temperature changes are not too rapid and the system is not operating too long a time at undesirable speeds. The spools are being rotated at barring speeds by utilizing the generators as motors. After barring the generators are being shut down and the magnetic bearings, if any, are being deactivated after the rotation has stopped. The process is then being cooled down by fans for sufficient amount of time.

The hot shutdown sequence is otherwise similar to the normal shutdown sequence except the burner is immediately stopped from the load without gradually decreasing the electric power output.

Grid-off shutdown is only related to grid loss conditions, and thus the emergency stop sequence is automatically activated to prevent a runaway of the gas turbine shafts. During grid loss conditions, the power supply from the grid is not available, and the control system is kept operational by supplying auxiliary power from the batteries. In case of a grid loss condition, the brake chopper used in the DC voltage intermediate circuit (DC bus) of the frequency converter is automatically activated when the DC bus voltage exceeds a specified limit. Thus, a runaway of the gas turbine shafts is prevented by directing the energy to the brake resistor(s) that convert(s) the electrical energy to heat or, alternatively, it may be stored in an energy storage such as a battery, a supercapacitor or a flywheel.

In case of a grid-off shutdown, the burner is immediately stopped by closing the fuel valves. Atomizing air is still continued to be supplied to the burner for a sufficient time in order to clean up the burner and the fuel pipes related to it (air purge). The dump valve used in the bypass line of the recuperator and the turbines is automatically opened. Power to the active magnetic bearings (AMB) and the cooling fans are supplied from the batteries. After rotation of the shafts of the both gas turbine spools has stopped, the AMB of the HP and LP gas turbine spools are deactivated. The cooling fans are continued to be run for a sufficient time needed to cool the generators. In grid-off conditions, it is important that the fuel valves are automatically closed and the dump valve is automatically opened as a result of power loss. The excess energy is directed to the brake resistor(s) as long as there is no risk of overspeed of the gas turbine shafts.

According to an embodiment of the present invention, the system includes an auxiliary system comprising an energy source which can be utilized in predefined (pre-thought) abnormal operating conditions such as, e.g. in case when there is a sudden surprising interruption in the electrical grid such as in case of loss-of-mains or in case of a maintenance outage, in order to safely and in controlled manner ramp the system up or down or to control the power supplied to the load. In these cases, the control system of the gas turbine plant can be operated by utilizing the energy from the energy source of the auxiliary system. This energy source may be, e.g. but not limited to, a battery or a bank of batteries, a supercapacitor, a flywheel or a fuel cell system. By utilizing the auxiliary system, the control of the gas turbine remains operational and is able, e.g., to shut down the system safely or may run the system in an islanding condition.

According to various embodiments of the present invention, the nominal power and/or rotational speed ratings of the generators are nominally substantially equal. According to various embodiments, the ratings may differ ten percent from each other at most and still fall under the concept of "substantially equal" rating disclosed herein. In certain embodiments, the gas turbine process may be designed in such a way that it is beneficial to have slightly higher difference in the power ratings and/or rotational speed ratings of the generators in order to optimize the operation of the system. The limit for the difference in the ratings (ten percent above) may, depending on the case, thus also be 15 percent.

Features described in the preceding description may be used in combinations other than the combinations explicitly described. Although functions have been described with reference to certain features, those functions may be performable by other features whether described or not. Although features have been described with reference to certain embodiments, those features may also be present in other embodiments whether described or not.

The invention claimed is:

1. A method for operating a land-based or marine-based multi-spool gas turbine system for generating electrical power to supply a load, the land-based or marine-based multi-spool gas turbine system comprising:
   at least two spools comprising a first spool having a first turbine and a first compressor mounted on a first shaft, the first turbine arranged to receive a gas at an elevated temperature to be expanded in order to produce mechanical power, and a second spool having a second turbine and a second compressor mounted on a second shaft, the second turbine arranged to receive the gas to be expanded in order to produce mechanical power, wherein the first turbine is a highest pressure turbine and the first compressor and the second compressor are arranged to receive air and to compress the air;
   a first heat generating equipment operable to generate heat and to transfer the heat into the air compressed by the first compressor to provide the gas at the elevated temperature to produce mechanical power to drive the first compressor and a first generator mechanically coupled to the first shaft;
   the at least two spools being in fluid communication with each other, wherein the second turbine is arranged to receive the gas from the first turbine, the first turbine arranged to operate at a higher pressure;
   at least two generators comprising the first generator mechanically coupled to the first shaft and a second generator mechanically coupled to the second shaft, the at least two generators being operable to generate electrical current to supply the load, and the at least two generators being independently controllable of each other; and
   control equipment comprising processing circuitry including a computer, the control equipment programmed to control operation of the land-based or marine-based multi-spool gas turbine system, wherein the method comprises:
      in a first control mode, controlling rotational speeds of the first generator and the second generator, independently of each other so as to directly control rotational speeds of the first shaft and the second shaft of the at least two spools, and regulating an inlet temperature of the first turbine so as to maintain the inlet temperature of the first turbine substantially at a predefined maximum allowable value when supplying power in a first power range; and
      in a second control mode, controlling the rotational speeds of the first generator and the second generator at predefined substantially constant values, and regulating the amount of heat generated in the first heat generating equipment when an operating point is being varied when supplying power in a second power range below the first power range.

2. The method according to claim 1, wherein the method comprises utilizing a first heat exchanger to pre-heat the compressed air from the first compressor before being fed into the first heat generating equipment, the first heat exchanger arranged to transfer heat from the gas from the second turbine of the at least two spools into the compressed air received from the first compressor.

3. The method according to claim 2, wherein the method comprises, in a third control mode, controlling the rotational speeds of the first generator and the second generator and controlling the amount of heat generated to maintain the temperature of the gas injected into the first heat exchanger from the second turbine substantially at a second predefined maximum allowable value when supplying power in a third power range between the first power range and the second power range.

4. The method according to claim 2, wherein the second turbine is a lowest pressure turbine.

5. The method according to claim 1, wherein the method comprises:
   utilizing a second heat generating equipment operable to generate heat and transfer the heat into the gas prior being fed into the second turbine; and
   regulating the amount of heat generated in the second heat generating equipment so as to maintain an inlet temperature of the second turbine substantially at a third predefined maximum allowable value.

6. The method according to claim 1, wherein the method comprises controlling the rotational speeds of the first generator and the second generator so that the rotation of the first shaft and the second shaft of the at least two spools are decelerated or accelerated through predetermined speeds of the at least two spools.

7. The method according to claim 6, wherein the method comprises determining an undesirable speed by utilizing measurement data from active magnetic bearings or an accelerometer or a position sensor or an eddy-current sensor in connection with the at least two spools.

8. A land-based or marine-based multi-spool gas turbine system for generating electrical power to supply a load, the land-based or marine-based multi-spool gas turbine system comprising:
   at least two spools comprising a first spool having a first turbine and a first compressor mounted on a first shaft, the first turbine arranged to receive a gas at an elevated temperature to be expanded in order to produce mechanical power, and a second spool having a second turbine and a second compressor mounted on a second shaft, the second turbine arranged to receive the gas to be expanded in order to produce mechanical power, wherein the first turbine is a highest pressure turbine, the first compressor and the second compressor are arranged to receive air and to compress the air;
   a first heat generating equipment operable to generate heat and to transfer heat into the compressed air by the first compressor to provide the gas at the elevated temperature to produce mechanical power to drive the first compressor and a first generator mechanically coupled to the first shaft;
   the at least two spools being in fluid communication with each other, wherein the second turbine is arranged to receive the gas from the first turbine, the first turbine arranged to operate at a higher pressure;
   at least two generators comprising the first generator mechanically coupled to the first shaft and a second generator mechanically coupled to the second shaft, the at least two generators being operable to generate electrical current to supply the load, and the at least two generators being independently controllable of each other; and
   control equipment comprising processing circuitry including a computer, the control equipment programmed to control operation of the land-based or marine-based multi-spool gas turbine system, the control equipment configured to:
      in a first control mode, control rotational speeds of the first generator and the second generator, independently of each other so as to directly control rotational speeds of the first shaft and the second shaft of the at least two spools, and regulate an inlet temperature of the first turbine so as to maintain the inlet temperature of the first turbine substantially at a predefined maximum allowable value when supplying power in a first power range; and
      in a second control mode, control the rotational speeds of the first generator and the second generator at predefined substantially constant values and regulate the amount of heat generated in the first heat generating equipment when an operating point is being varied when supplying power in a second power range below the first power range.

9. The land-based or marine-based multi-spool gas turbine system according to claim 8, wherein the land-based or marine-based multi-spool gas turbine system comprises a first heat exchanger arranged to receive the compressed air from the first compressor, and pre-heat the compressed air with heat transferred from the gas from the second turbine of the at least two spools before the compressed air is fed into the first heat generating equipment.

10. The land-based or marine-based multi-spool gas turbine system according to claim 8, wherein the first heat generating equipment comprises external heat generating equipment having a heat generation unit operable to generate heat and an associated heat exchanger operable to transfer the heat generated in the first heat generation unit into the compressed air from the first compressor.

11. The land-based or marine-based multi-spool gas turbine system according to claim 8, wherein the land-based or marine-based multi-spool gas turbine system comprises a power electronics unit coupled with the first generator and the second generator, the power electronics unit operable to process alternating currents from the first generator and second generator, and convert the alternating currents to alternating currents suitable for supply to the load.

12. The land-based or marine-based multi-spool gas turbine system according to claim 11, wherein the power electronics unit comprises at least two rectifiers, each one of the at least two rectifiers arranged to convert a respective alternating current from the first generator or the second generator to produce direct currents at a non-alternating voltage, and an inverter arranged to convert the non-alternating direct currents from the at least two rectifiers to the alternating currents suitable for supply to the load.

13. The land-based or marine-based multi-spool gas turbine system according to claim 8, comprising a second heat generating equipment arranged to receive the gas from the first turbine and reheat the gas prior to being fed into the second turbine.

14. The land-based or marine-based multi-spool gas turbine system according to claim 8, wherein the first generator and the second generator have substantially equal power ratings and substantially equal rotational speed ratings.

15. The land-based or marine-based multi-spool gas turbine system according to claim 9, wherein the control equipment is configured to, in a third control mode, control the rotational speeds of the first generator and the second generator and control the amount of heat generated to maintain a temperature of the gas injected into a first heat exchanger from the second turbine substantially at a second predefined maximum allowable value when supplying power in a third power range between the first range and the second power range.

16. The land-based or marine-based multi-spool gas turbine system according to claim 8, wherein the second turbine is a lowest pressure turbine.

17. The land-based or marine-based multi-spool gas turbine system according to claim 9, wherein the second turbine is a lowest pressure turbine.

18. The land-based or marine-based multi-spool gas turbine system according to claim 9, comprising a third spool having a third turbine mounted on a third shaft, wherein the third turbine is a lowest pressure turbine.

19. A non-transitory computer program product comprising computer program code embodied on a computer readable medium, wherein said computer program code is, when executed on a processor of a computer, further arranged to cause the computer to control operation of a land-based or marine-based multi-spool gas turbine system comprising:
   at least two spools comprising a first spool having a first turbine and a first compressor mounted on a first shaft, the first turbine arranged to receive a gas at an elevated temperature to be expanded in order to produce mechanical power, and a second spool having a second turbine and a second compressor mounted on a second shaft, the second turbine arranged to receive the gas to be expanded in order to produce mechanical power, the first compressor and second compressor arranged to receive air and to compress the air, wherein the first turbine is a highest pressure turbine;

a first heat generating equipment operable to generate heat and to transfer the heat into the compressed air from the first compressor to provide the gas at the elevated temperature to produce mechanical power to drive the first compressor and a first generator mechanically coupled to the first shaft;

the at least two spools being in fluid communication with each other, wherein the second turbine is arranged to receive the gas from the first turbine, the first turbine arranged to operate at a higher pressure; and at least two generators comprising the first generator mechanically coupled to the first shaft and a second generator mechanically coupled to the second shaft, the at least two generators being operable to generate electrical current to supply the load, and the at least two generators being independently controllable of each other; and wherein the control of the operation of the land-based or marine-based multi-spool gas turbine system by the computer comprises:

in a first control mode, controlling rotational speeds of the first generator and the second generator independently of each other so as to directly control rotational speeds of the first shaft and the second shaft of the at least two spools, and regulating an inlet temperature of the first turbine so as to maintain the inlet temperature of the highest pressure turbine substantially at a predefined maximum allowable value when supplying power in a first power range; and in a second control mode, controlling the rotational speeds of the first generator and the second generator at predefined substantially constant values, and regulating the amount of heat generated in the first heat generating equipment when an operating point is being varied when supplying power in a second power range below the first power range.

20. The non-transitory computer program product according to claim 19, wherein the control of the operation of the land-based or marine-based multi-spool gas turbine system by the computer comprises, in a third control mode, controlling the rotational speeds of the first generator and the second generator and controlling the amount of heat generated to maintain a temperature of the gas injected into a first heat exchanger from the second turbine of the at least two spools substantially at a second predefined maximum allowable value when supplying power in a third power range between the first power range and the second power range.

\* \* \* \* \*